US010959099B2

(12) United States Patent
Segal

(10) Patent No.: US 10,959,099 B2
(45) Date of Patent: *Mar. 23, 2021

(54) SMART WEARABLE DEVICES AND SYSTEM THEREFOR

(71) Applicant: Natalya Segal, Even Yehuda (IL)

(72) Inventor: Natalya Segal, Even Yehuda (IL)

(*) Notice: Subject to any disclaimer, the term of this patent is extended or adjusted under 35 U.S.C. 154(b) by 157 days.

This patent is subject to a terminal disclaimer.

(21) Appl. No.: 16/256,382

(22) Filed: Jan. 24, 2019

(65) Prior Publication Data
US 2020/0245147 A1 Jul. 30, 2020

(51) Int. Cl.
| | |
|---|---|
| *H04W 12/08* | (2009.01) |
| *G06F 1/16* | (2006.01) |
| *H04W 4/80* | (2018.01) |
| *H04W 84/12* | (2009.01) |
| *H04L 29/06* | (2006.01) |
| *G06F 8/65* | (2018.01) |
| *G06F 8/61* | (2018.01) |
| *H04B 1/3827* | (2015.01) |
| *G06F 1/3212* | (2019.01) |
| *G06F 1/3234* | (2019.01) |
| *G06F 9/50* | (2006.01) |

(52) U.S. Cl.
CPC ............ *H04W 12/08* (2013.01); *G06F 1/163* (2013.01); *G06F 8/61* (2013.01); *G06F 8/65* (2013.01); *H04B 1/385* (2013.01); *H04L 63/101* (2013.01); *G06F 1/325* (2013.01); *G06F 1/3212* (2013.01); *G06F 9/5088* (2013.01); *H04W 4/80* (2018.02); *H04W 84/12* (2013.01)

(58) Field of Classification Search
CPC ....... H04W 12/08; H04W 84/12; H04W 4/80; H04L 63/101; H04B 1/385; G06F 1/163; G06F 8/65; G06F 8/61; G06F 1/3212; G06F 1/325; G06F 9/5088
USPC ................................................ 717/168–178
See application file for complete search history.

(56) References Cited

U.S. PATENT DOCUMENTS

| | | | | |
|---|---|---|---|---|
| 8,479,269 | B1* | 7/2013 | Malreddy | H04W 12/0808 726/4 |
| 9,389,993 | B1* | 7/2016 | Okmyanskiy | H04L 63/101 |
| 10,225,721 | B2* | 3/2019 | Segal | G06F 3/017 |
| 2020/0245147 | A1* | 7/2020 | Segal | G06F 8/65 |

* cited by examiner

Primary Examiner — Marina Lee

(57) ABSTRACT

A description is therefore provided of technologies enhancing interoperability of devices located in a proximity from each other, with the goal of improving service performance and security. Interoperability between a wearable device on user's hand and a door or a mobile phone results in improved security as well as convenience of use. Interoperability between mobile devices and nearby devices belonging to different users, able to provide local computational power, results in lowering of bandwidth requirements for data transfer, by means of performing computations on the data being collected locally, as opposed to it being done on a remote server.

20 Claims, 20 Drawing Sheets

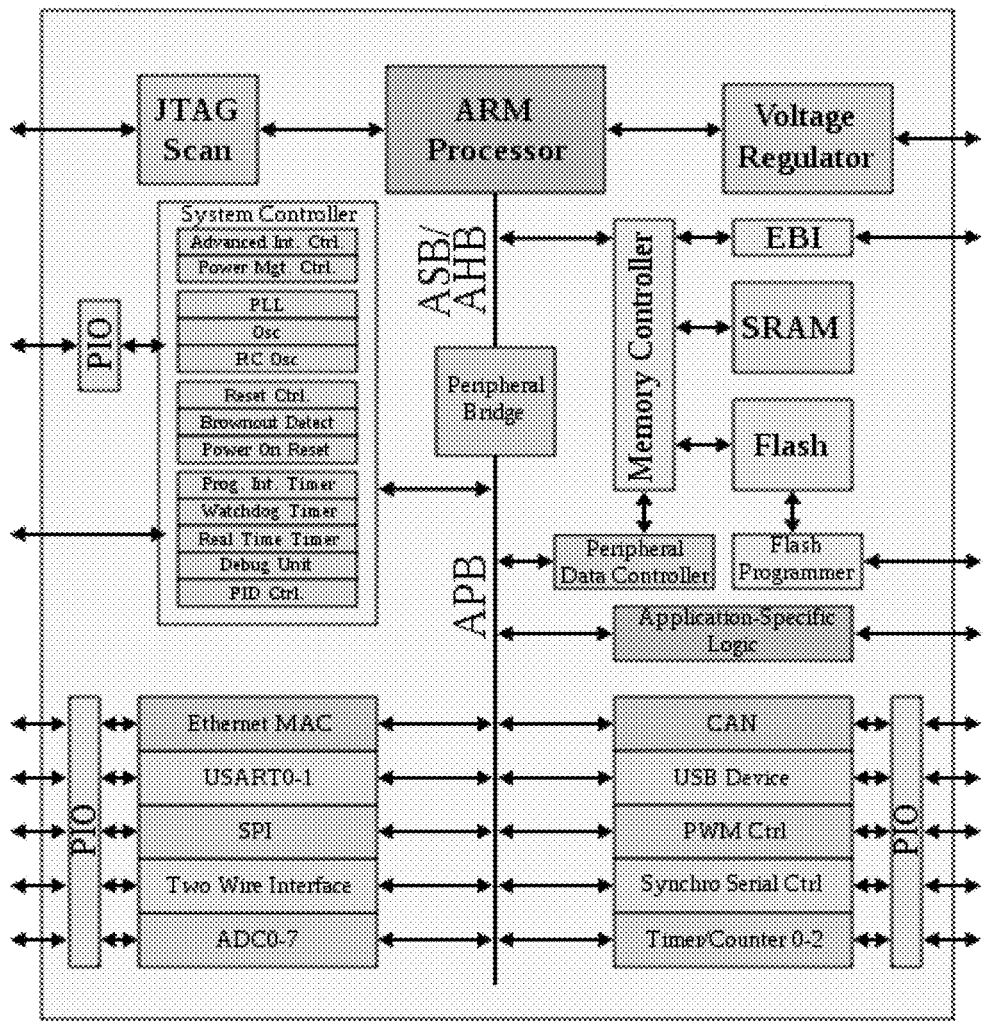
Fig. 1.A (Prior Art)
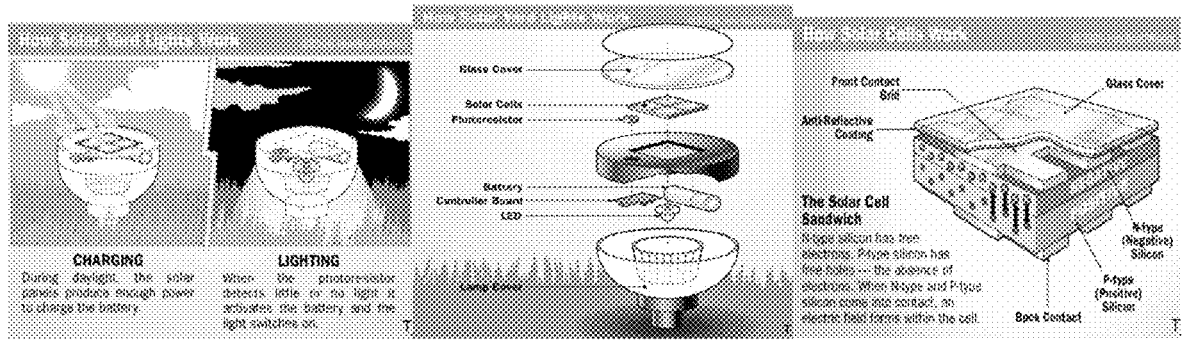
Fig. 1.B, 1.C, 1.D (Prior Art)

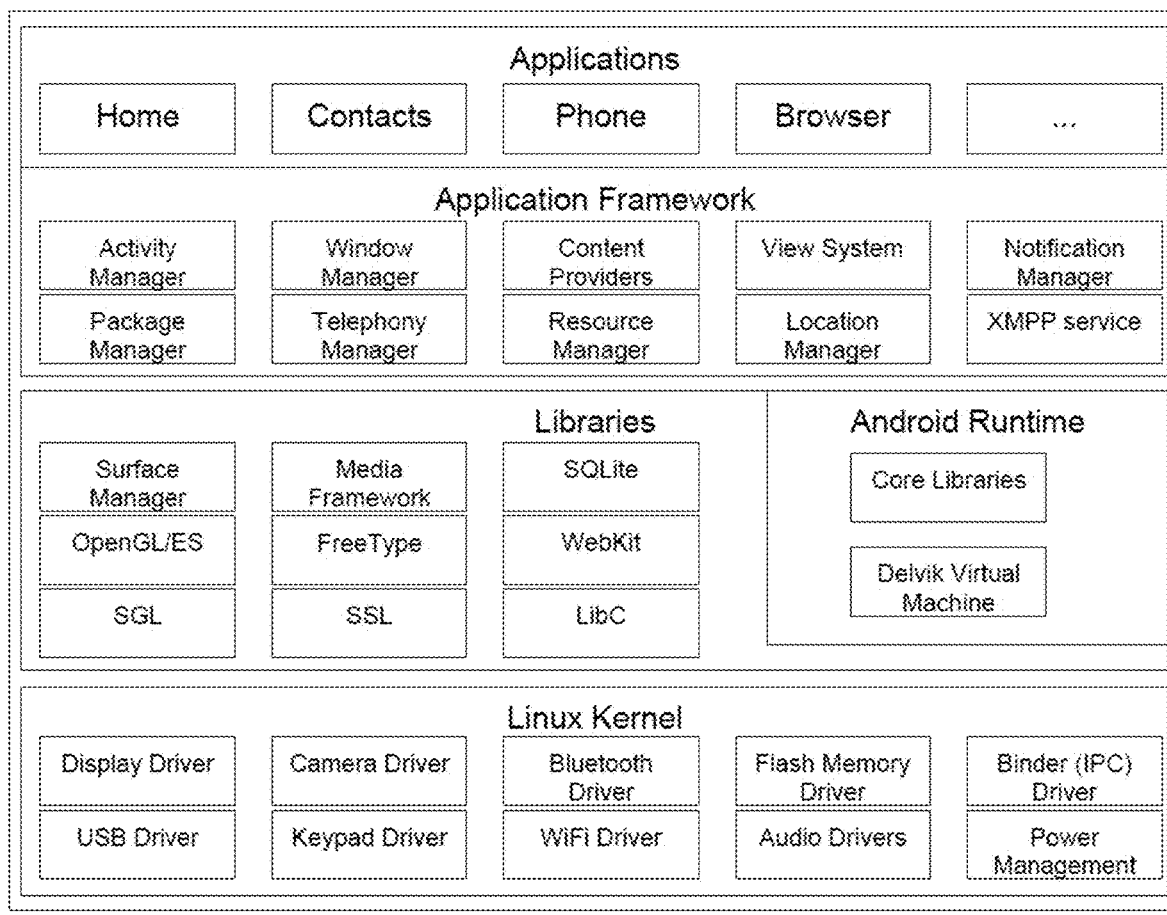
Fig. 1.E (Prior Art)
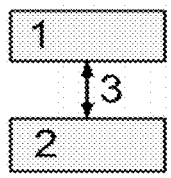
Fig. 2

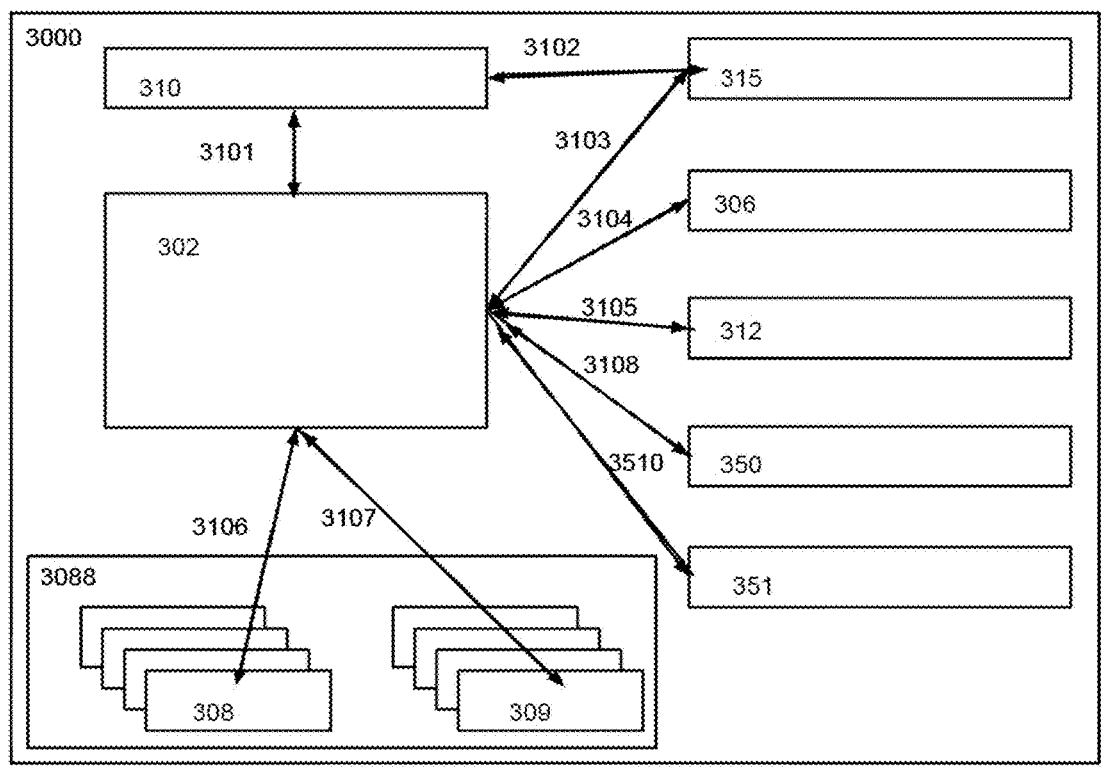
Fig. 3.A
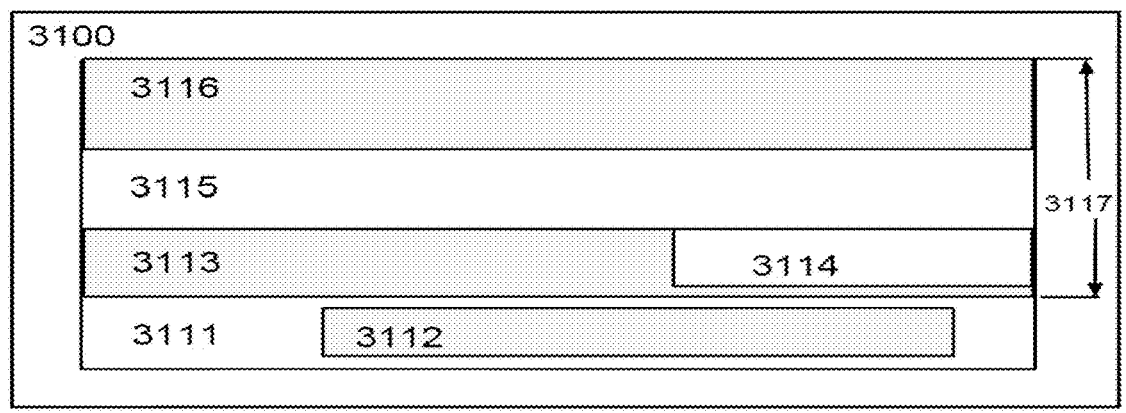
Fig. 3.B
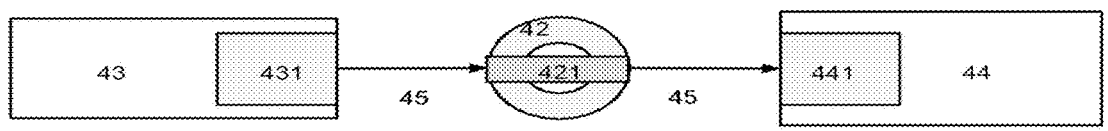
Fig. 4.A

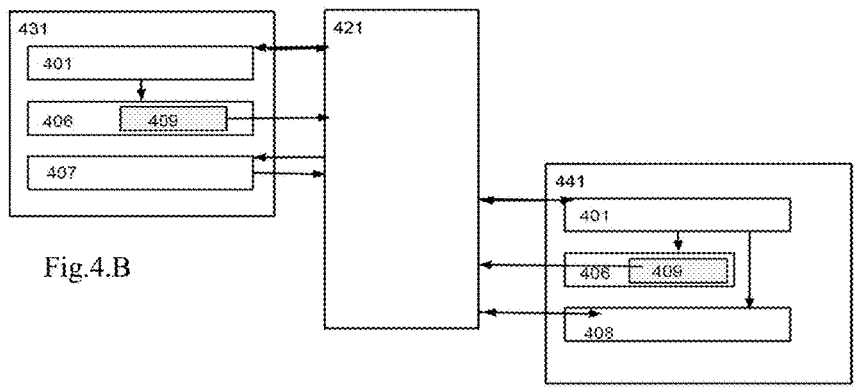
Fig.4.B
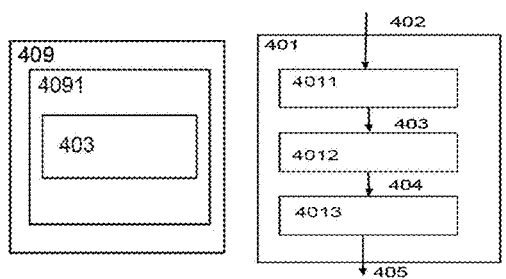
Fig.4.D    Fig.4.C
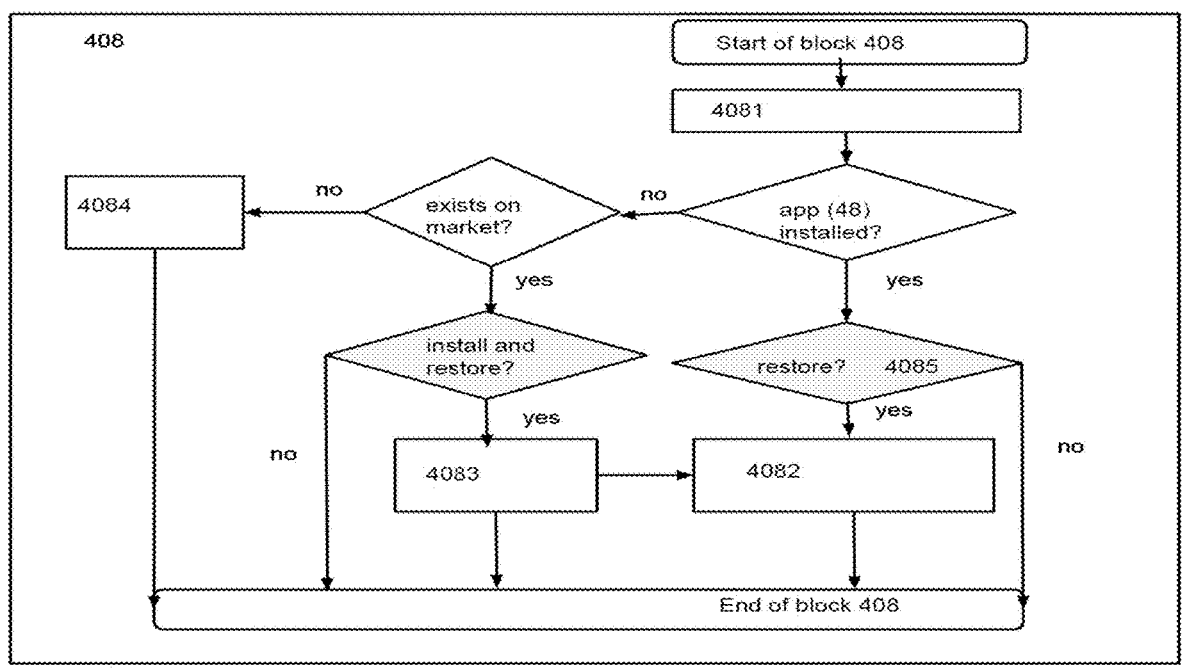
Fig.4.E

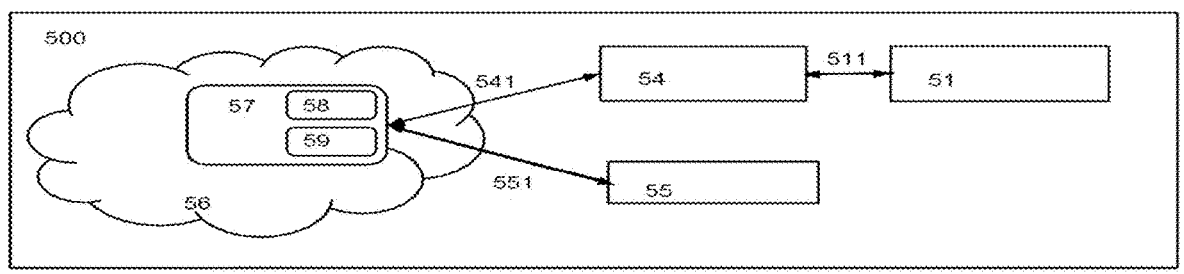
Fig. 5
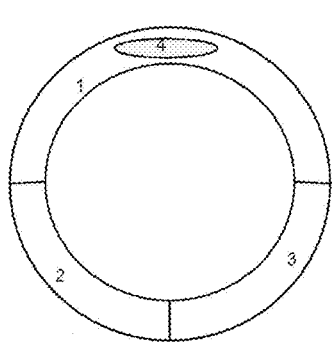
Fig.7.B
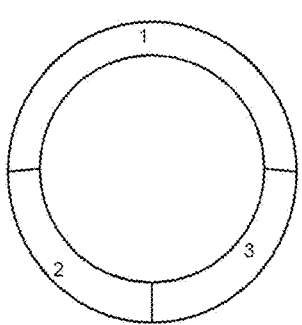
Fig.7.A
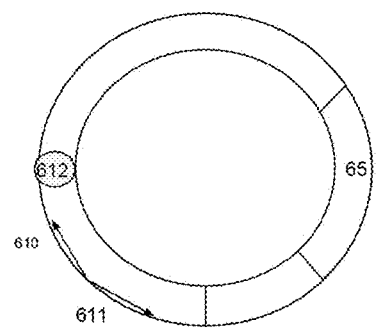
Fig.6
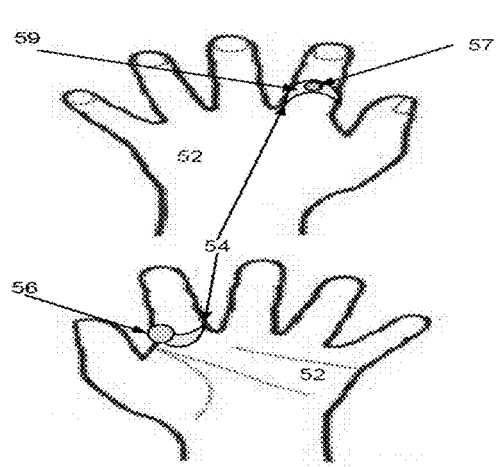
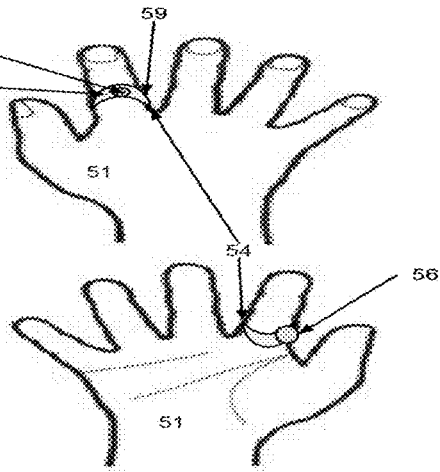
Fig.7.C
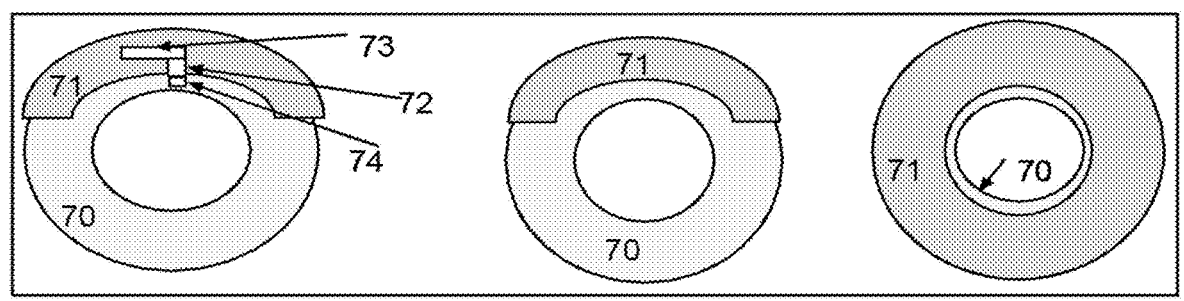
Fig.7.D

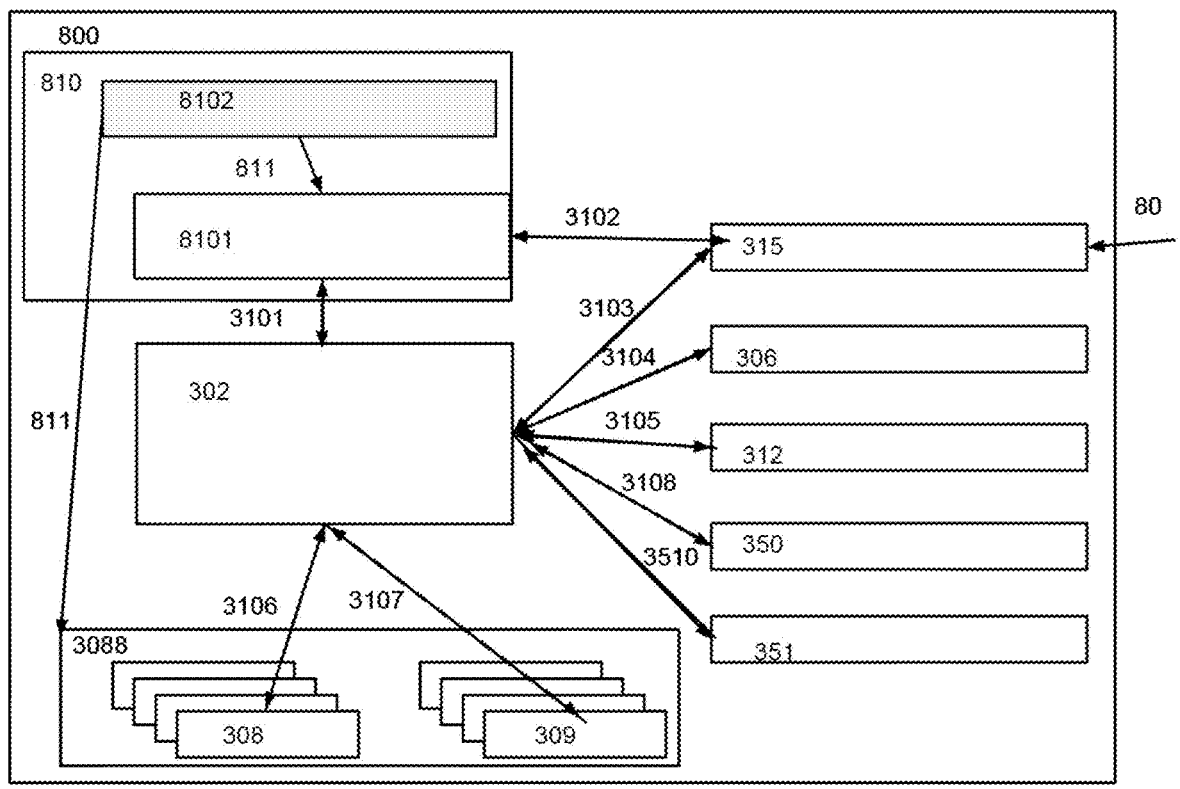
Fig.8.A
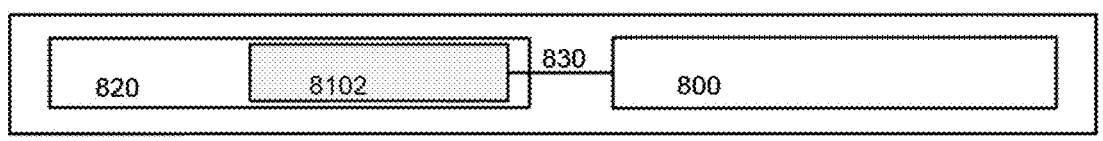
Fig.8.B
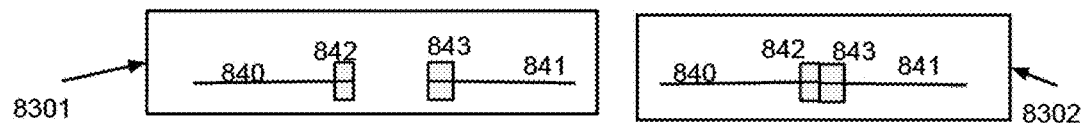
Fig.8.C

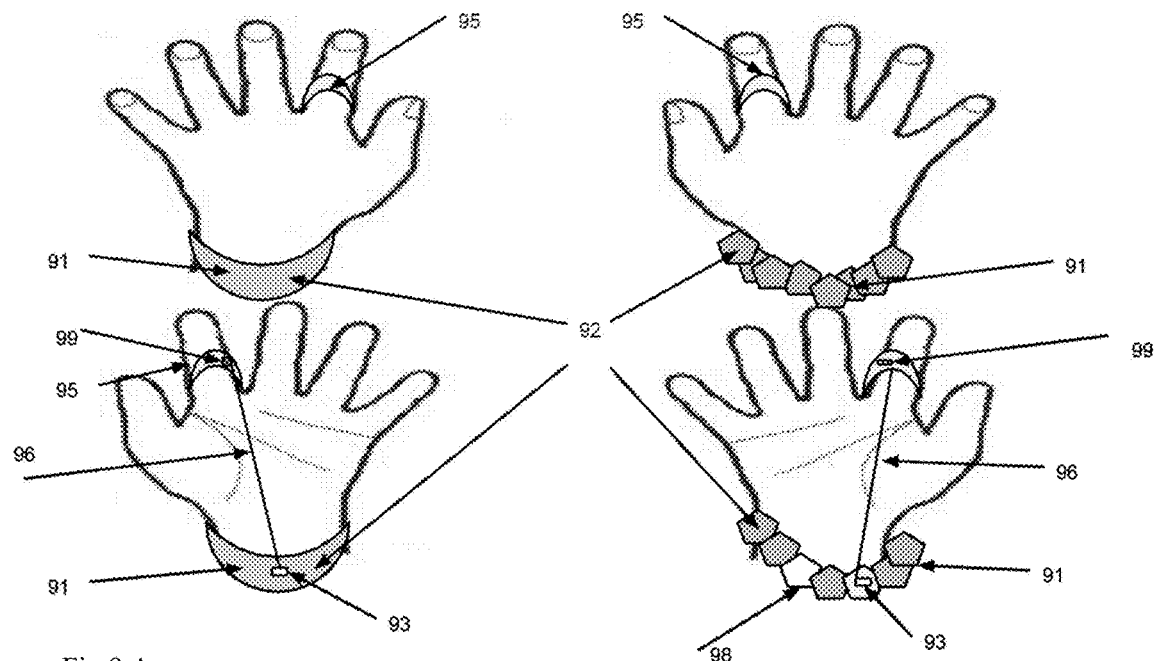
Fig.9.A
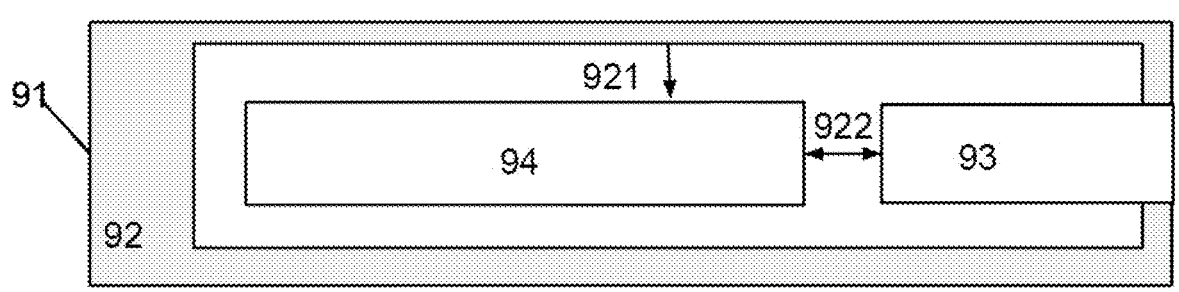
Fig.9.B

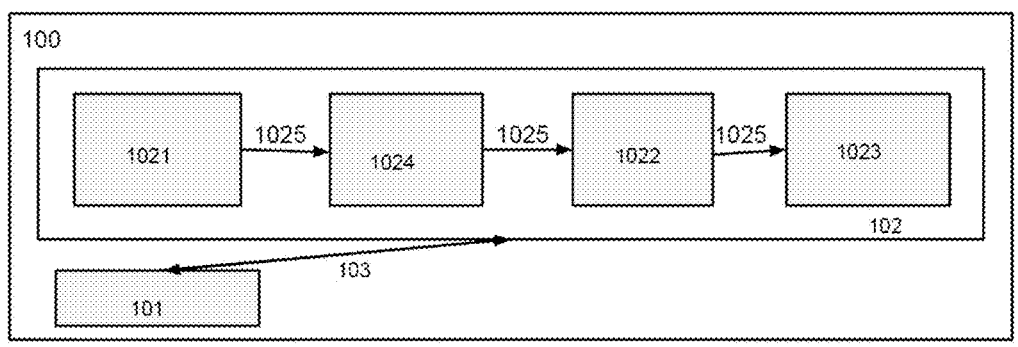
Fig.10.A
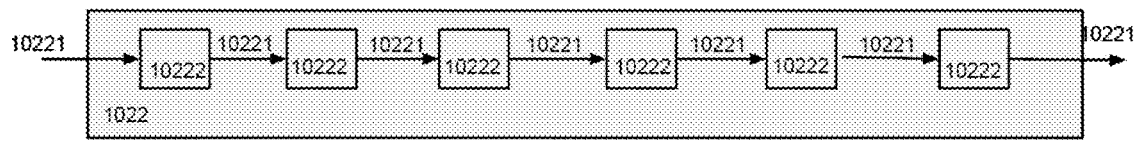
Fig.10.B
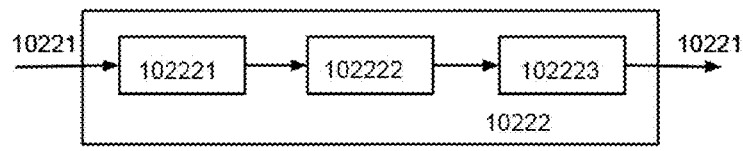
Fig.10.C

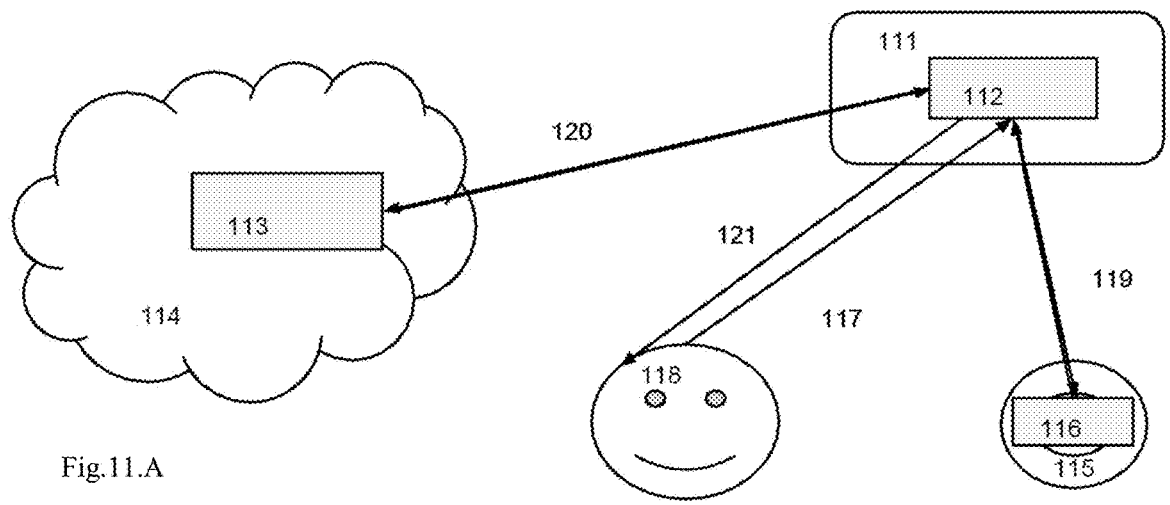
Fig.11.A
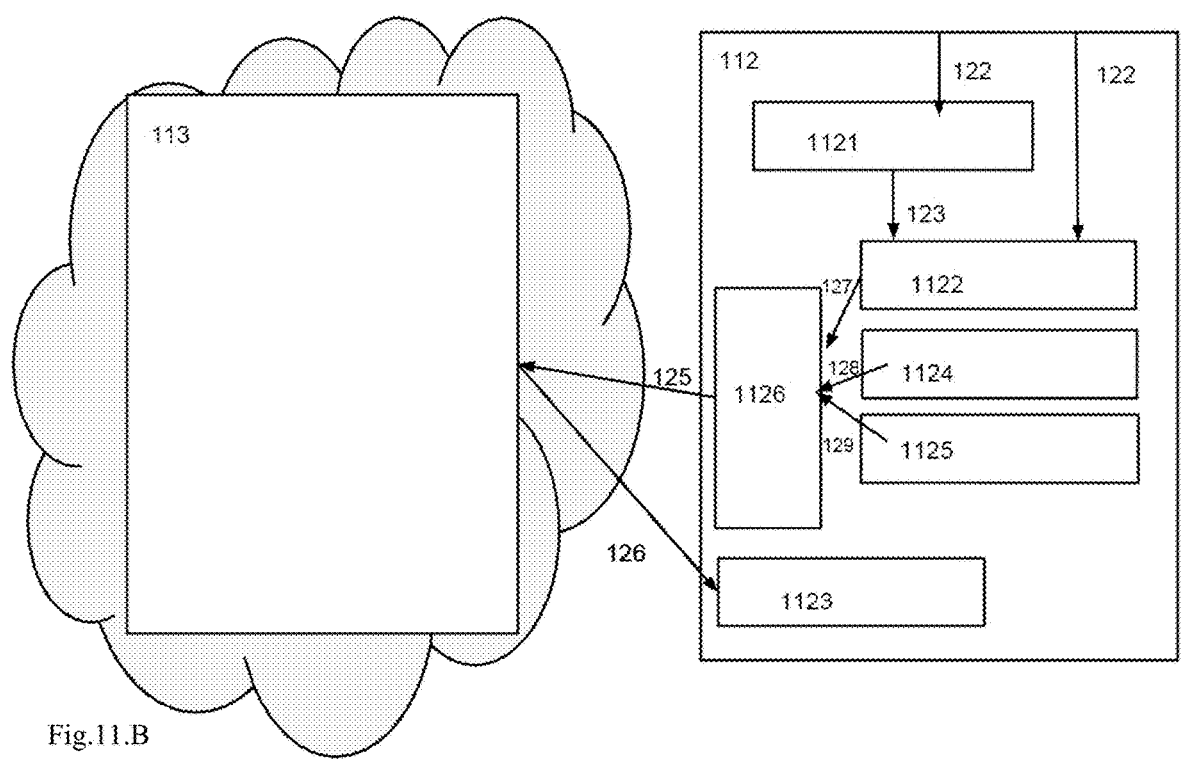
Fig.11.B

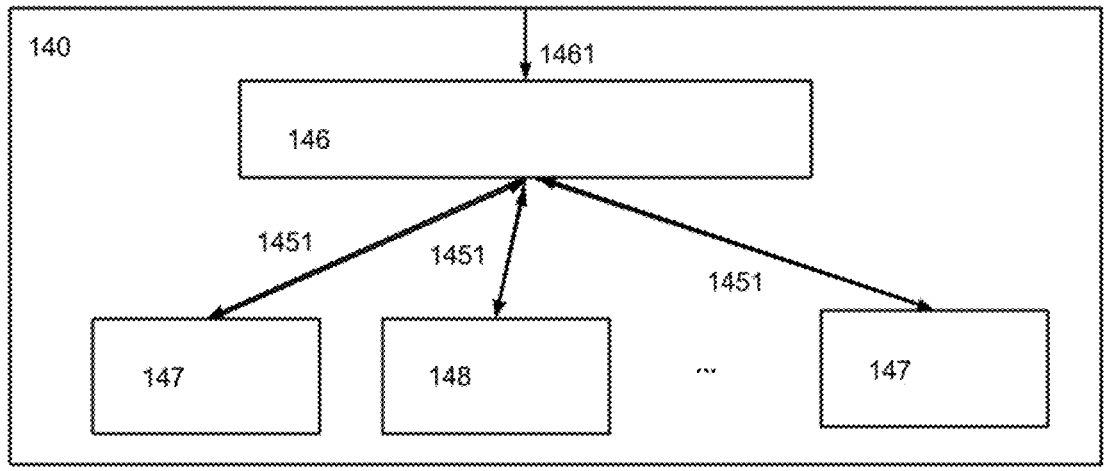
Fig.14.A
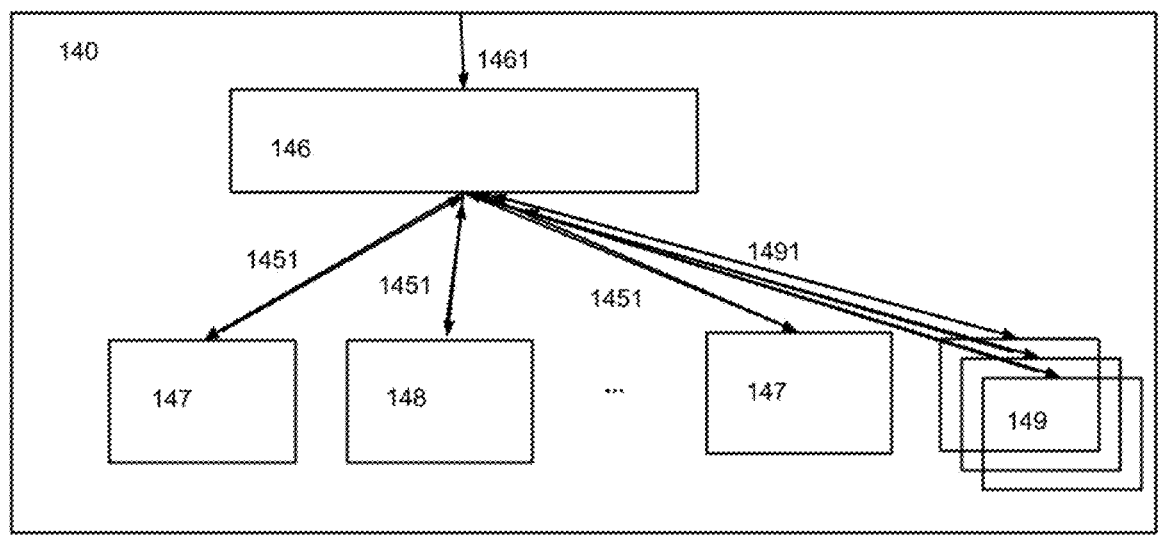
Fig.14.B

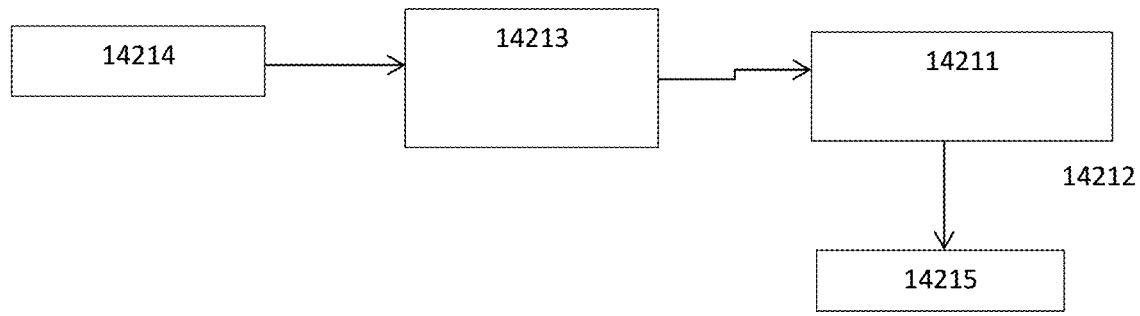
Fig.14.C
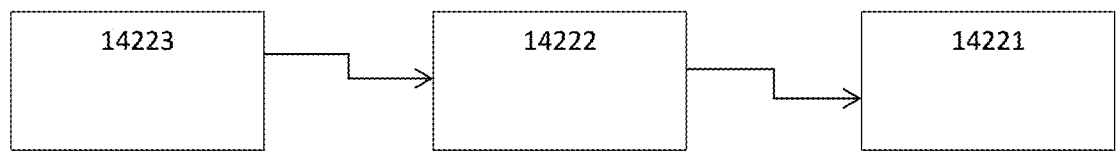
Fig.14.D
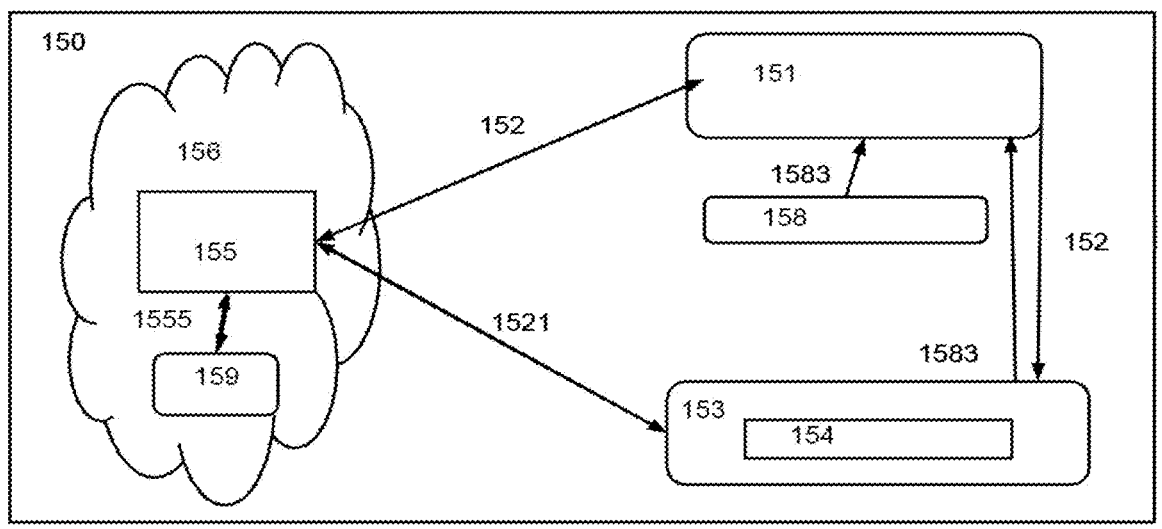
Fig. 15

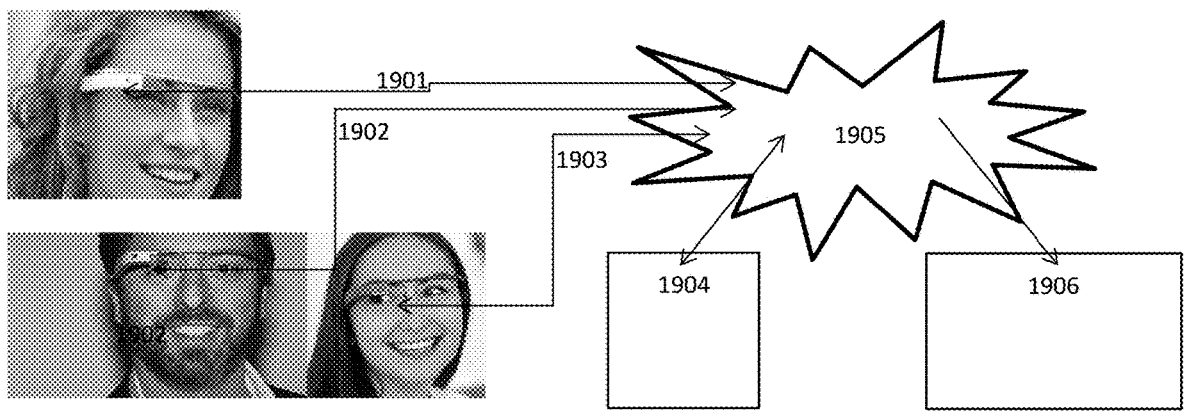
Fig. 19
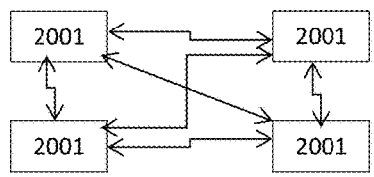
Fig.20.A
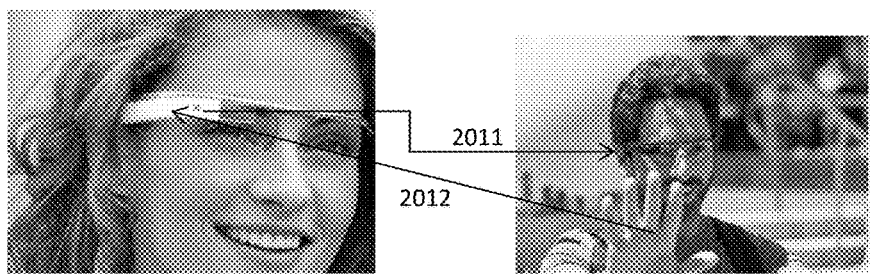
Fig.20.B
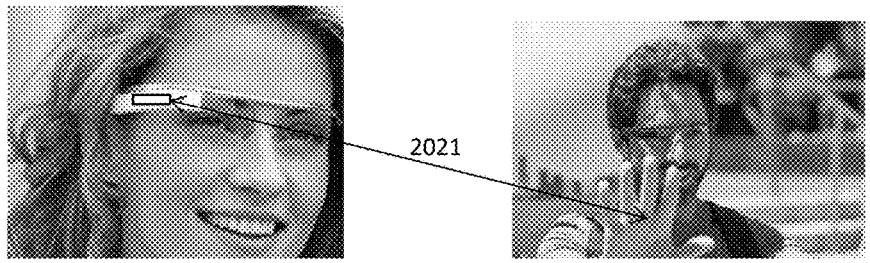
Fig.20.C

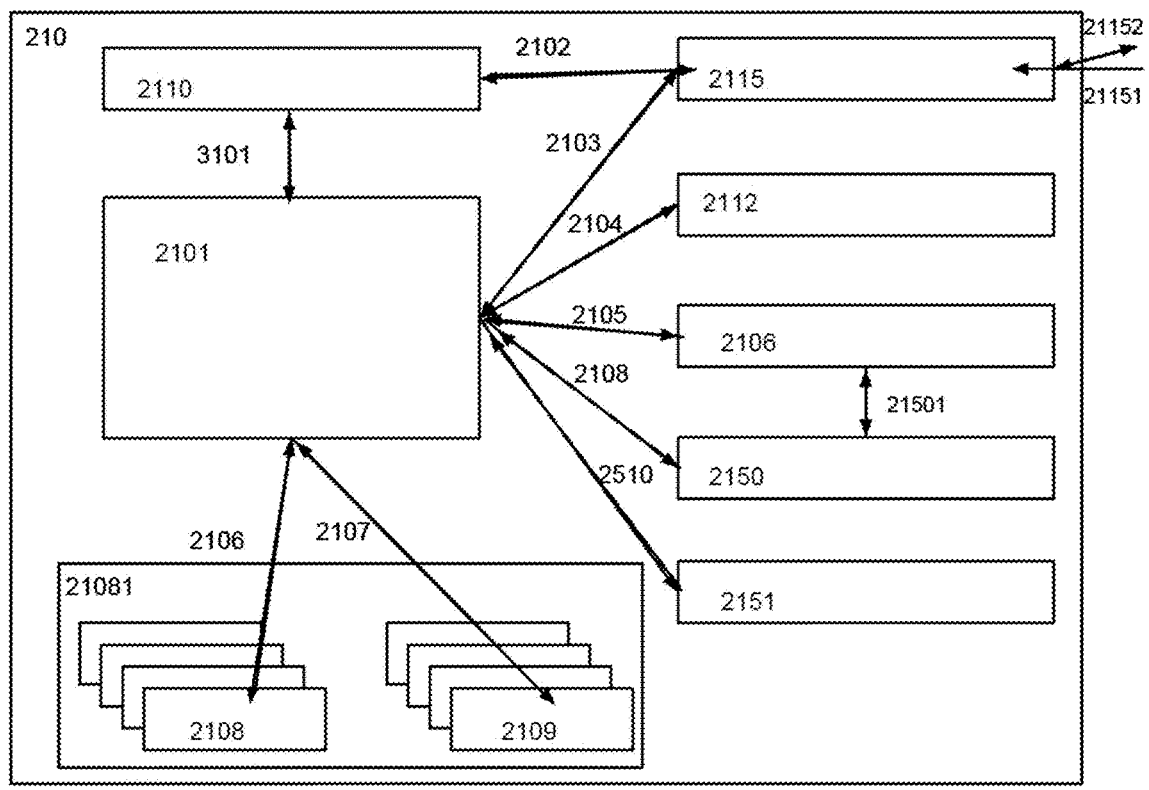
Fig.21.A

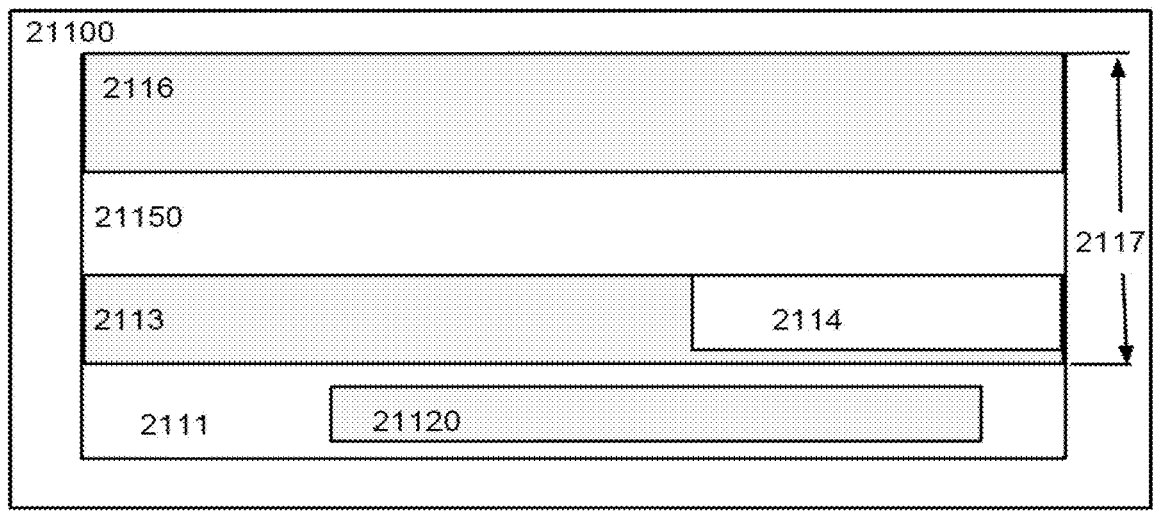
Fig.21.B
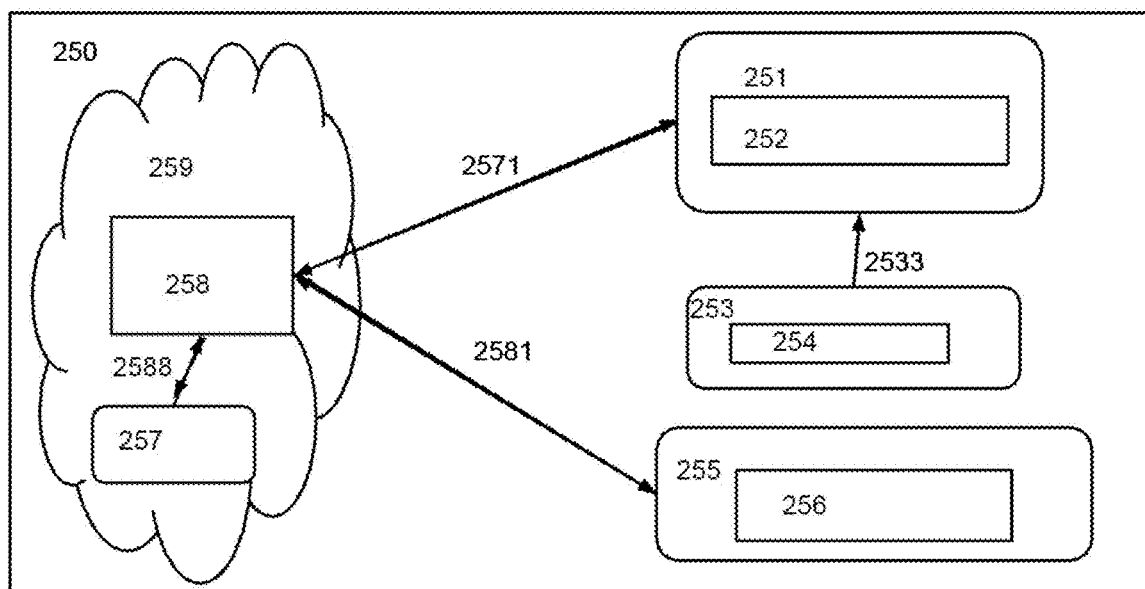
Fig.22

This patent application is a continuation under 35 U.S.C. 120 of U.S. Pat. No. 9,955,286 B2, filed on May 8, 2014, entitled "SMART WEARABLE DEVICES AND SYSTEM THEREFOR". The disclosure of the U.S. Pat. No. 9,955,286 B2 is herein incorporated by reference in its entirety. This patent application claims priority to, and incorporates fully by reference, U.S. Provisional Patent Application No. 61/820,788, filed May 8, 2013.

SMART WEARABLE DEVICES AND SYSTEM THEREFOR

CROSS-REFERENCE TO RELATED APPLICATIONS

FIELD OF THE INVENTION

The present invention relates to the field of wearable computer devices, and particularly to means of improving wearable computer usability, control, and security.

BACKGROUND OF THE INVENTION

Wearable computers, also known as body-borne computers, are miniature electronic devices that are worn by a user underneath, with, or on top of clothing, or as head mounted devices, including but not limited to those types disclosed in the above-reference Provisional Application and in Patent Publication Nos. US 20070052672, US 20140045547, WO 2001007993, U.S. Pat. No. 7,605,714, WO 2012128824, U.S. Pat. No. 8,508,472, US 20060164383, and US 20120050144, each of which is incorporated fully by reference herein. Such wearable technology has been and continues to be developed for uses including but not limited to general or special daily purposes, information technologies, and media development. Wearable computers include but are not limited to smart glasses, augmented reality glasses, smart lenses, smart rings, and mobile devices.

An application store or marketplace, a type of digital distribution platform for application software, is often provided as a component of an operating system (or an application pre-installed by a vendor, or a $3^{rd}$ party application) on a personal computer, smartphone, wearable devices, or tablet. Application stores typically take the form of an online store, where users may browse through different categories and genres of applications (for example, productivity apps, multimedia apps, games, etc.), view information and reviews of the apps, make purchases, and automatically download and install the application on their device. Many application stores, curated and regulated by their owners, require that submissions go through an approval process where applications are inspected for compliance with certain guidelines (such as those for quality and content). They also require that a commission be collected on each sale of a paid application, such as that adopted by the iOS and Android mobile operating systems. Despite this, similar systems for application distribution exist in some operating systems (particularly Linux distributions) through graphical front-ends to their package management systems.

Currently available software markets typically operate in the granularity of a single application software. Thus, currently available markets do not support installation, updating, discovery, or removing a software system, written by external developers, which operates on several devices (possibly with different user identity) and allows for device interoperability among two or more smart devices. Currently available markets also assume that the device on which a user installs, updates, or removes an application is somehow connected to the internet, thus creating a serious inconvenience for users operating devices that do not have an internet connection.

Furthermore, additional definitions, terminology, examples of prior art, and general information is incorporated herein fully by reference from the following patents and publications: US 20130201316, EP 0789320 A2, U.S. Pat. No. 7,932,893, EP 2367339 A1, WO 2014012486 A1, US 20070052672, US 20140045547, WO 2001007993, U.S. Pat. No. 7,605,714, WO 2012128824, U.S. Pat. No. 8,508,472, US 20060164383, US 20120050144, U.S. Pat. No. 8,212,859, US 20130201316, US 20130044042, U.S. Pat. No. 8,177,182 B1, US 20130201316 A1, U.S. Pat. No. 8,612,136 B2, U.S. Pat. No. 5,905,460 A, US20120262463 A1, Ashbrook et al., "Nenya: Subtle and Eyes-Free Mobile Input with a Magnetically-Tracked Finger Ring," CHI 2011, Session: Touch 1: Tactile & Haptics, 2011, "Blink behaviour based drowsiness detection—method development and validation" Ulrika Svensson LiTH-IMT/BIT20-EX-04/369-Linköping 2004 (note: "behavior" stands for behavior mistake in original text), "Tizen® 2.2.1 Compliance Specification for Mobile Profile", "Android 4.4 Compatibility Definition Revision 1 Last updated: Nov. 27, 2013" by Google Inc., "ARM c7-M Architecture Reference Manual" by ARM, "TrackPoint System Version 4.0 Engineering Specification" by IBM, "Guide to Bluetooth Security" by National Institute of Standards and Technology, "Bluetooth wireless technology basics: by HP, "Internet of Things: Converging Technologies for Smart Environments and Integrated Ecosystems" by Dr. Ovidiu Vermesan SINTEF, Norway Dr. Peter Friess EU, Belgium, "For the Win: How Game Thinking May Revolutionize Your Business Paperback" by Kevin Werbach and Dan Hunter, "3D Computer Graphics—Alan Watt—3th Edition", "Digital Image Processing" (3rd Edition) by Rafael C. Gonzalez and Richard E. Woods, "Computer Vision: Algorithms and Applications" by Richard Szeliski, "3D Reconstruction from Multiple Images Part 1: Principles" by Theo Moons, Luc Van Gool, and Maarten Vergauwen, "3D Reconstruction: of human/object using a network of cameras and inertial sensors. Including GPU-based real-time implementation", May 15, 2013, by Hadi AliAkbarpour, Hassan Aliakbarpour, and Hajar Naseh, "Applied Cryptography: Protocols, Algorithms, and Source Code in C", by Bruce Schneier, "Linux Security Cookbook", by Daniel J. Barrett, Richard E. Silverman, and Robert G. Byrnes, "TCP/IP Illustrated, Vol. 1: The Protocols (Addison-Wesley Professional Computing Series)", by W. Richard Stevens, "ZigBee Network Protocols and Applications Hardcover", edited by Chonggang Wang, Tao Jiang, and Qian Zhang, "Zigbee Wireless Networking", by Drew Gislason, "Bluetooth Low Energy: The Developer's Handbook", by Robin Heydon, and "Inside Bluetooth Low Energy (Artech House Remote Sensing Library)", by Naresh Gupta.

SUMMARY OF THE INVENTION

The present invention comprises novel devices and systems (hereafter "metamarket(s)") for uploading, selling, downloading, activating, updating, and using a set of applications as one system on various wearable, mobile devices, IOT (internet of thinks), home, and other devices, increasing interoperability between the different applications in the system, in order to perform a specific task or tasks. Further, the invention comprises a hierarchy of entities on a meta market. The system may consist of different applications that may be used (e.g., downloaded, updated, installed, activated) as a whole. The applications may run either on the same device or on different devices made by one or several different vendor(s)/developer(s). In some embodiments of the present invention, the applications in the system are anticipated to be written by the same vendor, but there are other embodiments that may allow for different vendors to provide (i.e., create, upload, sell, update, etc.) various applications that may perform in any combination of the manners described herein.

BRIEF DESCRIPTION OF THE DRAWINGS

FIG. 1.A illustrates the prior art—system on chip example.

FIGS. 1.B, 1.C, and 1.D illustrate an example of prior art, solar energy.

FIG. 1.E illustrates an example of prior art—an Android architecture, and an example of mobile operating system (OS) architecture layers.

FIG. 2 illustrates a computer device, either wearable or not controlled by remote control device.

FIG. 3.A illustrates functional blocks comprising an example implementation of a remote control hardware, such as smart ring, smart bracelet, or smart watch.

FIG. 3.B illustrates software on remote control device.

FIG. 4.A illustrates a transmission of state from one device to another device, enabled by the remote control device.

FIG. 4.B illustrates a flowchart logic of software enabling transmission of state.

FIGS. 4.C, 4.D and 4.E illustrate various implementation examples and further details for broader process illustrated by FIG. 4.B.

FIG. 5 illustrates a method and system to reset user credentials remotely if the remote control device is lost or stolen.

FIG. 6 illustrates an example of providing input to a remote control device.

FIG. 7.A illustrates an example of wearable remote control in a form of a piece of jewelry—a ring on user's finger.

FIGS. 7.B and 7.C illustrate examples of a wearable remote control.

FIG. 7.D illustrates jackets or functional cover cases (waterproof) for remote control devices.

FIG. 8.A illustrates functional blocks composing an example of smart ring capable of receiving energy from solar cells.

FIG. 8.B illustrates a solar unit incorporated into a remote control device jacket.

FIG. 8.C illustrates an example implementation of a connector (830), see FIG. 8.B.

FIG. 9.A illustrates usage of a solar energy accumulator in the form of a jewelry part, for example, as a bracelet.

FIG. 9.B illustrates building blocks of a solar energy accumulator in the form of a jewelry part or any other wearable accessory.

FIG. 10.A illustrates a software and a system for changing picture (by either brightening or otherwise changing the picture) seen by a user that wears smart glasses.

FIG. 10.B illustrates an image filtering and image processing software pipeline.

FIG. 10.C illustrates possible implementation details for the example in FIG. 10.A.

FIG. 11.A illustrates a system and a software allowing user to create comments (optionally accompanied by pictures, videos, GPS, and time information) on a map occupied in a way avoiding inconvenience when instead done by typing.

FIG. 11.B illustrates possible software implementation details for the example in FIG. 11.A.

FIG. 14.A illustrates a Meta market example.

FIG. 14.B illustrates a Meta market example also allowing for device purchase as a part of the system.

FIG. 14.C illustrates a Meta Market example architecture comprising the Meta Market server (14211) and an Apps System Database (14215) in cloud (14212) and the Meta-Market client(s) (14213) allowing the vendor(s) (14214) to create new systems and link apps to those systems and end users to download the system to their devices.

FIG. 14.D illustrates an example of using a "friend device" (14221). The user activates a remote photography system from his/her smart ring (14223), the smart ring (14223) communicates the request to the user's mobile device (in the user's pocket) (14222), the mobile device sends the request to the "friend device" (14221), in this example, the smart glasses of another user. The request is to take a picture, verify that the user is on the picture (by face recognition), and send the result to the user mobile or cloud account without saving the image on the other user's smart glasses. Note: a user may designate by a gesture not to take a picture "now" and this will prevent the smart glasses of a friend from taking a picture. Implementation: gesture is converted into a command in the smart ring, then sent to mobile and then to smart glass of a friend, alternative implementations may be based on image recognition of the previewed image on the "friend's" smart glass camera. See also FIGS. 20.B and 20.C.

FIG. 15 illustrates a lecture notes system.

FIG. 19 illustrates how devices (1901, 1902, 1903, 1904) send their privacy level and location (arrows) to a single aggregation spot (1905) and receive the aggregated privacy level of the area back (arrows). Among the devices receiving a report may be an indication screen (1906) on a café wall, indicating a current level of privacy in a place, for instance, by a screen color or picture.

FIG. 20.A illustrates how each device (2001) may broadcast its privacy level to every other device in proximity (2001).

FIG. 20.B illustrates an example of two users wearing smart glasses. The recording device may communicate: "I am recording", and a user wearing the second device may receive a note from his device and then designate by a gesture to exclude that user from the video.

FIG. 20.C illustrates an alternative example of designating by indication screen a start of recording, followed by designating by gesture that one would like to be excluded from a recorded frame.

FIG. 21.A illustrates a camera oriented wearable computer-hardware.

FIG. 21.B illustrates a camera oriented wearable computer-software.

FIG. 22 illustrates a system and a method for effective donations gathering.

DETAILED DESCRIPTION OF THE PREFERRED EMBODIMENT

Today, the end user downloads applications to his/her device. The continued development of the minimization and specification of devices creates an abundance of specified microcomputers (mobile, wearable, embedded, etc.), creating a need for systems of applications, which run on one device (or shared devices), performing a mutual task together and utilizing the capabilities of the devices they run on.

The meaning of the terms "friend(s)," as used herein. To clarify, "friend" is used to mean any additional user that the first user may or may not know. "Friend device" or "friend's device" is used to mean that additional user's device, which may assist the first user or the first user's device(s) in any variation of the manners discussed herein. "Friend application" is defined as an application running on a friend device.

Figure 23:
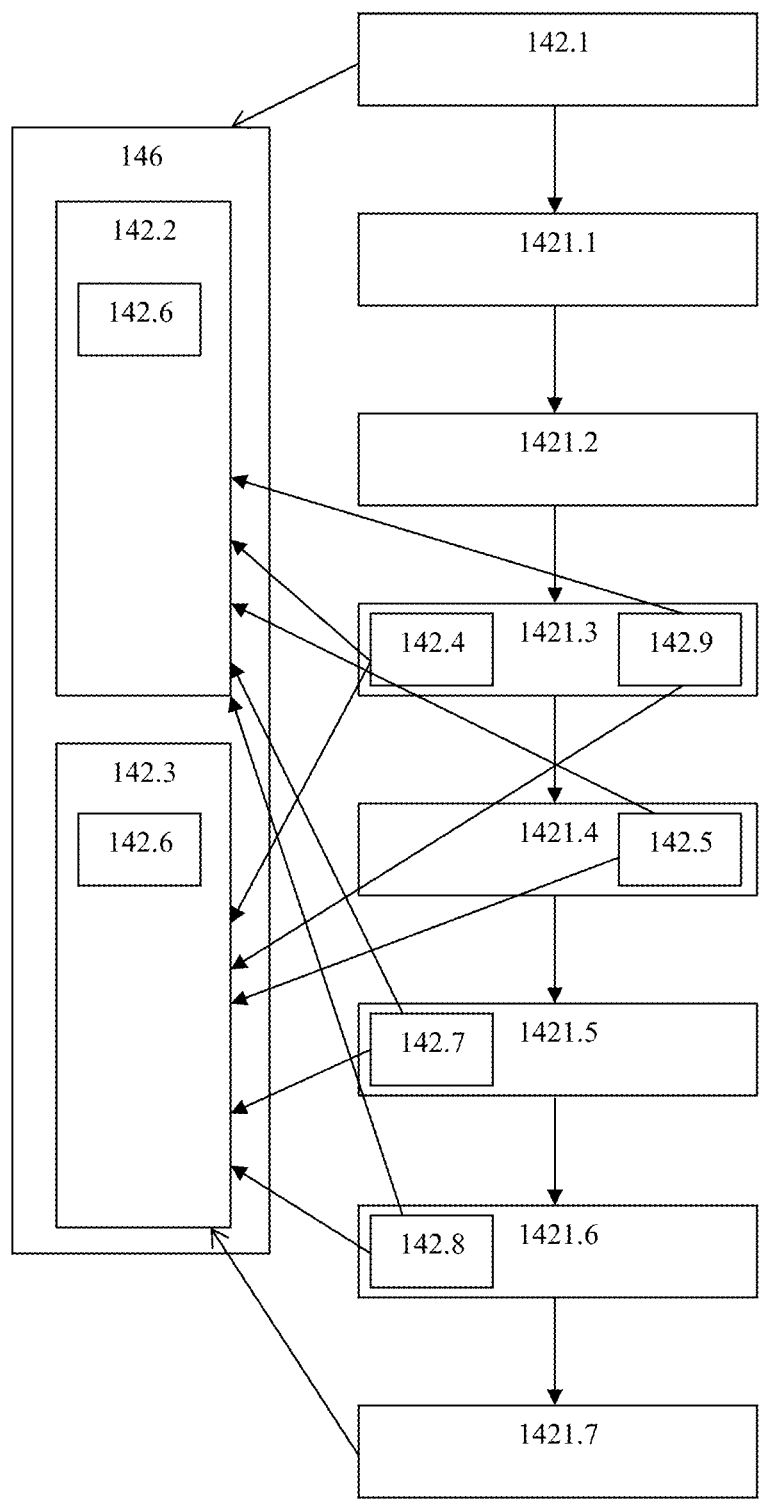
FIG. 23 illustrates an example of a flow chart covering the creation of a system of applications on the metamarket.

The present invention comprises novel systems (hereafter "metamarket(s)", "MetaMarket(s)", "Meta Market(s)", "Meta-Market(s)", "meta-market(s)", or "Market") for uploading, selling, downloading, activating, updating, and using a set of applications as one system (142.2, 142.3) on various wearable, mobile devices, IOT (internet of things), home, and other devices, increasing interoperability between the different applications in the system (see FIG. 23). Further, the invention comprises a hierarchy of entities on a market (146). The systems (142.2, 142.3) may consist of different applications (142.8) that may be used (e.g., downloaded, updated, installed, activated) as a whole. The applications (142.8) may run either on the same device or on different devices made by one or several different vendor(s)/developer(s). In some embodiments of the present invention, the applications in the system are anticipated to be written by the same vendor, but there are other embodiments that may allow for different vendors to provide (i.e., create, upload, sell, update, etc.) various applications that may perform in the manner described herein. Some applications (142.8) may be permanent members of a system (142.2) and some applications may join the system on demand.

FIG. 23 illustrates an example of a flow chart of steps corresponding to the creation of systems of applications and management of such systems on the metamarket (146), as disclosed by the present invention. Specifically, the steps in the figure are as follows: (142.1) a Meta Market system manager is appointed (person or entity) (142.1); (1421.1) the Meta Market system manager (142.1) may create a system (142.2) on a Meta-Market (146), either a SW system (142.2) or a system comprising SW and HW (142.3)) and may name it on the Meta-Market (146); (1421.2) Meta-Market (146) creates a unique ID for the system (142.2, 142.3) and creates a permanent record for the System with this ID (142.6). Any information for the system will be linked (e.g., in the database) to this ID; (1421.3) A system manager (142.1) or anybody authorized by the system manager (142.1) may define a list of applications types (142.4) that participate in the system (142.2). For each application type (142.4), a set of requirements (142.9) may be defined; (1421.4) A system manager (142.1) may define the applications submission policy (142.5) for the system; (1421.5) Authorized vendors (142.7) may upload applications and link them to the system (142.7) via the Meta-Market client; (1421.6) Authorized vendors (142.7) and/or the system manager (142.1) may link an application (142.8) to the system (142.2, 142.3); and (1421.7) Additional requirements may be added at the level of applications (142.8) by vendors.

Applications submission policy (142.5) examples include but are not limited to: (1) Allow an open submission of applications matching an application type, (2) Provide a whitelist of vendors allowed to submit applications of each type, (3) Adopt a blacklist approach, meaning that he/she may provide a list of vendors that are not allowed to submit applications for each application type.

Authorized vendors (142.7) are authorized by the policy (142.5). Authorized vendors (142.7) and/or the system manager (142.1) may link an application to the system. The application should match one of the application types (142.4). The application may either be newly uploaded (step 1421.5) or exist on the market (146). Application (142.8) mobile, wearable, or other known software applications or software programs, capable of running on one or more computer device types (wearable, mobile, home computers, internet of things computer devices, security cameras, any device capable of running embedded software, etc.).

Application type Requirements (142.9) include but are not limited to: (1) on what devices may the application type (142.4) run, (2) what services should (required)/may (allowed) it (142.4) export to other elements of the system (142.2), (3) what services should (required)/may (allowed) it (142.4) export to dynamic elements of the system (142.2), and (4) what services should (required)/may (allowed) it (142.4) export elements of the system running under another user. A general policy may also be defined for system parts that run under another user (not the user an application that provides the service runs under/with) regarding what services should (required)/may (allowed) be (142.4) exported outside the system (142.2).

Application requirements include but are not limited to: (1) on what devices may the application (142.8) run when acting as a part of the system. Different implementation of the Meta-Market (146), acting as a part of the system, may be defined differently, for example: (1) invoked as a part of the system, (2) acting as a part of the system (example: "friend applications may act as a part of a system (142.2), being invoked independently, (3) in some implementations, it may be defined as installed as a part of the system, (4) in some implementations of the metamarket (146), it may be defined as all of the above options.

Developer Registration. In order to create applications according to the present invention, the system may allow developers to register with the Meta Market using any one of the ways commonly known, for example, Android and iOS market registration methods, as disclosed in prior art patent documents and publications including but not limited to those listed above (see Background).

Uploading Application Systems to the Metamarket. An application system (i.e. a set of applications running as one) may be provided by either one vendor (one vendor providing all the applications) or multiple vendors (different vendor may provide different applications in one system). The sample steps for uploading a system that is provided by one vendor are as follows: (1) The vendor may create a new system and gives it a name; (2) A Meta Market service may generate a unique ID for the particular application system (142.2); (3) The Meta Market (146) may link the unique ID to the information provided by the vendor, for instance this information may be: system name, developer/vendor account within the Meta Market; (4) The vendor may add one or more applications (142.8) to the system; (5) The vendor may either upload the new application(s) (uploading using known methods as disclosed in prior art patent documents and publications including but not limited to those listed above (see Background)) or may link an existing (already on the Meta Market) application (142.8) to a particular system (142.2) (the existing linked application (142.8) is previously uploaded as a single application or as a part of another system (142.2)); (6) The vendor may upload an unlimited number of applications (142.8) and may link them to the particular system (the linking may be performed either in the system configuration file or via the Meta Market interface, and in the latter case, the configuration file may be created on the Meta Market (146) side of operations); (7) For each application (142.8) (independent of the system (142.2)) the vendor may designate the devices on which the application may run; (8) For applications within a particular system (142.2), the vendor of the application may further restrict the list of devices on which this application runs (alternatively, the vendor may expand the list of devices; thus, a list of devices is stored for each set of applications forming a particular system (142.2); (9) For each application (142.8) within a particular system (142.2), the vendor may define what functionality this application (142.8) has with regard to the other applications in the same system (defined in a system configuration file, which is, e.g., an xml file resembling the Manifest.xml file in Android apps, but on the system level) and what functionality it (142.8) may export to applications that may operate within the same system under another user and to systems and applications outside the system (142.2); (10) For each system, there may exist a configuration file which further defines the system security and privacy requirements (e.g., networking, email address, phone calls) as well as technical requirements; (11) For each application within the system (142.2), the vendor may define the devices, the operating systems (OS), and the versions of OS on which it runs; (12) The information on the system may be provided via the GUI or external services API and may be stored by the Meta Market (146) server in the form of a system configuration file, or alternatively, the information may be provided in the form of a system configuration file from the vendor; (13) If stored by the Meta Market server (14211), the system information may be stored in a database of the server (The meta market server (14211) may be located in a cloud, or alternatively located on dedicated servers, personal clouds, cloud solutions for verticals, among other possibilities).

The steps for uploading a system of applications provided by more than one vendor (may also be used for one vendor cases in some implementations of the Meta Market) are as follows:

(1) One vendor or a third party may create a particular system on the Meta Market (146). This entity or person is designated as the system manager (142.1) or administrator (some implementations of the Meta-Market (146) may use this or other name for this role) by the MetaMarket (146);

(2) In some implementations of the meta-market (146), the system manager (142.1) may be changed during different stages of the system's lifecycle;

(3) The system manager (142.1) may give the system a name;

(4) The Meta Market (146) creates a unique ID for the system (142.2) Any information, e.g., the database, with regard to the system may be linked to this ID;

(5) The system manager (142.1) may define a list of application types (142.4) (not a concrete application, but a type; to simplify human interface, the application type may be also extrapolated in part or in whole from an example, for instance, a system manager may ask to "copy a type from application AAA as in system BBB") that may participate the system (142.2) (more application types (142.4) may be added later, if desired, for instance during a system update), the application types may be divided to groups, for instance application types that are required for a proper functioning of the system, application types (142.4) that are not required for a proper functioning of the system (142.2) but are allowed to join the system (142.2) (those may be applications that participate dynamically in the system, regular optional applications, other applications) and application types (optional or not) that are allowed to run under other user then the rest of the system, other groups may also be defined;

(6) The system manager (142.1) may either allow an open submission of applications matching the application types (142.4) or may provide a whitelist of vendors allowed to submit applications of each type (142.4). Alternatively, the system manager (142.1) may adopt a blacklist approach, meaning he/she (142.1) may provide a list of vendors that are not allowed to submit applications for particular application types ("Application type" (142.4), as used herein, means an application taking a particular role in a particular system (142.2). The application type (142.4) is designated by a unique ID that comprises, for example, the system ID (142.6) and the unique ID of the application's role in the system. For example, within a lecture notes system, an application type may comprise those applications which perform a remote control of the smart glasses);

(7) If an open submission of applications per type is allowed, in some implementations of the Meta Market (146), voting mechanisms or crowdsourcing of information mechanisms are implemented (such as those disclosed in the prior art, see Background) to reveal the best application (142.8) or combination thereof, so end users download the best available option. The system manager (142.1) may authorize another person or entity (142.11) to perform functions (all or subset of functions) the system manager (142.1) may perform. Note the difference between a system manager in charge (142.14), a system manager (142.1), and those authorized (142.11) by a system manager to perform the system manager functions. The system manager (142.1) may authorize others to perform one or more of his/her (142.1) function, alternatively a system manager (142.1) may decide not to delegate his/her functions and not authorize others to perform them. The terms system manager (142.1), system manager in charge (142.14), and others authorized to perform a particular function of the system manager (142.1), as used herein, are interchangeable.

(8) The system manager in charge (142.14) may also approve him/herself to be an authorized vendor of one or more of the application types (142.4) comprising the system (if desired);

(9) The authorized vendors may upload applications and link them to the system via the Meta-Market client (14213). Alternatively, the authorized vendors may link an application (142.8), already existing on the market to the system (142.2);

(10) For each application type (142.4) comprising a system (142.2), the system manager in charge (142.14) may add the requirements of the application in a context of the system (142.2), such as what services are provided to other applications within the system, which devices run the particular application when acting as a part of the system (defined as: installed as a part of the system, or alternatively defined as invoked as a part of the system; different definitions are chosen in different implementations of the invention), what services the application provides to other systems when acting as a part of this system, what services may be dynamic, etc.

It should be noted that either type of Meta Market (146) described by the steps above, if desired, additionally employs a traditional review and voting mechanism (currently used on a per application basis) for determining the best option(s). Examples of such mechanisms include those disclosed by the Android play and iOS markets, as well as prior art documents (see Background).

For clarification purposes, as used herein, the system manager in charge of a particular system uploaded by a single vendor is defined as the single vendor him/herself. Although some embodiments of the present invention comprise such a system with a different (e.g., third party) system manager, the descriptions hereinafter presume that the system manager and single vendor are the same person.

Deleting/Removing a System of Applications from the Meta Market (146). The steps for removing a particular system with its applications may be as follows: (1) The system manager in charge (142.14) may place a request to remove the system from the Meta Market (146); (2) The Meta Market (146) server may review the list of applications (142.8) used by the system (142.2) and, for each application (142.8), may determine whether the application is used also by another system (142.2) (e.g., a reference count, as disclosed in the prior art); (3) If the application (142.8) is not used by another system, it may be removed from the Meta Market (146), followed by removal of related meta-information (e.g., functionality and device restriction, services lists, etc.); (4) If the application (142.8) is used by another system, then only the meta-information related to the system (142.2) being deleted may be removed, and the application (142.8) itself remains on the Meta-Market (146) (as it is used by another system); (5) Then, after going over the list of applications (142.8) that participate in the system (142.2), the system information may be removed from the Meta-Market (146).

The steps for deleting from the Meta Market only a system but not the applications it uses are as follows: (1) The system manager places a request to remove the system from the market (146); (2) The Meta Market (146) server reviews the list of applications used by the system and, for each application, determines whether the application is used also by another system (142.2) (example implementation: reference count); (3) For an application that is not used by another system, the server adds the application to the unreferenced application list (or any data structure, preferably persistently stored in a database); (4) Such unreferenced applications are easily removed from the Meta Market (146) later, if a Meta Market garbage collector is activated (some implementations of the present invention may comprise a Meta-Market garbage collector—typically incorporated into the Meta Market server (14211); the "garbage collector," when active, takes information in the Meta-market server database, or in shared memory, or receiving this information from the MataMarket server (14211), and removes applications that are not used by any system on the Meta-Market (146); a temporal protection mark is introduced to specific applications to prevent the garbage collector from removing those applications while their system definitions are edited, temporarily deleted, recreated, etc.; in this case, the garbage collector removes only those applications which are not used by any system on the Meta Market and not temporally protected); a temporal protection mark may be also used in the case where a system (142.2) is deleted with the applications (142.8) and the deletion is not postponed for the garbage collector to perform; (5) Alternatively, in some implementations, the Meta Market server (14211) immediately deletes the meta-information related to the system; (6) Thus, the system information is removed from the Meta-Market (146).

Updating a Particular System. The technical details of a system update on the Meta Market may be similar to or based upon those used for applications of prior art mobile app markets (such as, e.g., those disclosed in the referenced documents above, see Background). The steps for doing so are as follows: (1) The system manager performs a system level update (any change of information on the system level and any redefinition or updates to the application types (142.4), or application type restrictions or requirements); (2) If the system level changes require an application level update (142.4), the application vendors receive a notification and so have an opportunity to update the applications; (3) The system manager in charge (142.14) sets a deadline for applications update or negotiate otherwise the point in time when changes are activated on the system level (in the typical implementation of the Meta-Market (146), there is a grace period allowing the vendors to adapt their applications (142.8) to the new system requirements, so that the system does not break); (4) After the applications are updated (if need) or upon another update event decided by the system manager (depending on the particular implementation), the system manager in charge (142.14) activates the system changes in the Meta-Market (146), so that they are reflected in the production version of the system (142.2) (i.e. visible to users). In some implementations of the MetaMarket (146), the system manager in charge (142.14) may choose another application (142.8) suitable for the application type (142.4) if, after a grace period, one of the applications (142.2) is not properly updated (Example: system manager chooses a second best application as voted by users or by test groups, if the first best application (142.8) that is currently used is not properly updated after the update deadline).

A vendor is also capable of updating a particular application comprising part of a system. Such updates should be of a type that will not break the system (e.g., no change in hardware or software requirements), or of a type that change certain operating requirements of the application, among other options. Different implementations of the Meta Market may have differing rules for such updates including, but not limited to: Requiring pre-moderation of application changes by system managers in charge (142.14); Requiring post-moderation of application changes by system managers in charge (142.14); Not requiring moderation of application changes by system managers; Acting upon a policy defined by the system managers on a per system basis; Acting upon policies defined by larger group managers and adopted on system level. As an example, for the particular situation of embodiments requiring pre-moderation of application changes by the system manager: the following occurs: (1) the system manager in charge (142.14) receives a notification that there is updated version of one or more applications (142.8) within their system (142.2) (initiated by a vendor); (2) Users continue to use an older version of the application in the system until the moderation (i.e., testing and approval) process is complete or if the application's new version fails moderation (this allows the Meta-Market (146) to maintain version control of the applications, adopting known version control approaches (like in GIT, P4, SVN, etc.); (3) (Optional) A crowd sourced testing is performed—e.g., testing by a limited group of users that allow to change their version for the tested version, and when needed, in exchange for a free or reduced cost usage or in exchange for money or other reward. In some implementations, these "testers" may restrict a % of the usage time that they spend testing as well as, in some implementations, they may restrict the time they may test (example: it is inconvenient to test apps on some occasions so the "tester" may designate "not on Friday" for instance or "not on April 1"); (4) The system manager in charge (142.14) approves the new version of the application to be used in his/her system (142.14) and the new version is designated as an active version for that system; (5) Alternatively, the system manager may reject the new version of the application and continue using an old version for the system (note: different versions of the same application may be active in different systems; in this case the Meta-Market (146) may send a notification on a subject to the application vendor; on the application page on the Meta-Market, the vendor may see all the actively used (by systems) versions of his/her application as well as which system uses which version. The vendor may also receive the information change as a notification upon request or based on a policy. The application vendor may announce a "deprecation time" for particular versions of the application, after which (if not extended) the deprecated version is no longer supported by the vendor. In this case, the system managers that use the application versions marked as deprecated (or "will be deprecated on a particular date") receive a note and, in some implementations, also a grace time to be able to upgrade to newer versions); (6) The adoption of updated application versions may in some cases require the system managers in charge (142.14) of the systems that are using the application to change the system information or the application meta-information in the system. If desired, this is performed automatically by the Meta Market server (14211), but in preferred implementations of the Meta Market (146), such actions require system manager approval. In some cases, the system managers in charge (142.14) of the systems that are using the application may decide to choose another application (142.8) meeting the same type (142.4) requirements so not to change the system information.

Selling a Particular System. In the case of a system of applications provided by one vendor, a single set of billing information is set for the system, and the system is sold in a manner resembling selling an application on current mobile markets (such as Android, iOS). If the system includes applications provided by different vendors, each vendor has his/her own billing information. In this case, a system may include a billing policy defining a money division (for example: in %) between different application types participating in the system. The policy is defined or chosen (from policies offered by the Meta Market or third party services for billing or money management) by the system manager (142.1, 142.14) and confirmed by the applications vendors before implementation. Thus, upon the system purchase from the Meta-Market (146), the price paid by the buyer (user) is divided, comprising a fee to the Meta Market and vendors of the applications into amounts defined in the policy, and optionally, an additional fee to the system manager of the system. Note that some applications participating in the system are paid for but others may be free.

System Discovery by an End User. A user may search for a particular system or alternatively perform a free search (e.g., Google). A user may designate to allow only results matching his/her current devices, to allow any result, to allow results corresponding to a particularly chosen set of devices (for example: a user is willing to purchase a smart ring, but not new smart glasses, or willing to purchase binocular smart glasses but not monocular smart glasses, the reason being the usability of the same device for another system (142.2) as well), to allow results corresponding to the use of particular friend devices (for example, the particular friend devices are connected to the search event, so the Meta Market recognizes the set of devices participating and allowing to use their devices).

A user may designate that he/she prefers to spend minimal money or hold a minimal number of devices or minimize the device weight, or give other cumulative criteria in search, when purchasing (or searching for and maybe purchasing one after another) several applications at once. Example: a user may be interested in using a "bright glass" system, as described (FIG. 10.A, 10.B) in the referenced provisional application. This particular system performs significantly better on binocular glasses (example: augmented reality binocular smart glasses by Epson) and a lecture notes system that performs well on either binocular or monocular smart glasses. Such a user may place a joint search and ask to optimize for number of devices to purchase or based on price. Note that a "bright glass" system, as described in detail in the referenced provisional application, defines a system that changes (in this case brightens and adds light by ray tracing, for instance) the image the user sees when wearing the smart glasses.

The resulting systems are displayed to be chosen by a user and installed on user devices, and in the case of friend devices, a second user's (i.e. the friend's) approval is needed (depending on the friend device policy and particular implementation of the Meta Market (146)). If the desired system requires devices that the user doesn't have (e.g., a smart ring), some implementations of the Meta-Market (146) allow the user to purchase the missing device either from the meta market (146) or from a third party vendor. Additionally, the search may be saved in a history or a searcher's record. There may be an option to add some systems to a list of favorites and review and vote for preferred systems. Some implementations of Meta Market (146) may use gamification techniques to increase voting and reviewing, for other purposes of user engagement, or for other purposes.

The Meta Market (146) also recognizes end user devices from previous usage or from previous registration of the devices. The user may add a device he/she uses to the list of recognized devices. The user may also add a "friend device" to the list. The "friend device" is available only at particular times (e.g., when the user's friend who owns the friend device is nearby). For example: a user is with a friend and wants that friend device to take a picture of the user and send it (i.e. the picture) to the user's device or user's account in a cloud.

In some implementations, no evidence of the captured data remains on the "friend" device. Thus, implementing a privacy respecting peer-aided recording of photo, video, motion pictures (example: motion jpeg), 3D photo, 3D video, 3D motion pictures, etc. and features-detecting. The 3D image may be captured by simultaneous recording from several points (example: several friends devices with camera that either simultaneously start recording or start with a grace time given for network delays but recording for long enough time, so that there is enough recorded information from the same time, the reveal the 3D photo/video from such an information the time stamps should be synchronized. This may be done in post processing for instance comparing the visual and audio features of the frames, by techniques known in prior art. A 3D model of a scene may be reconstructed from enough captures of data of the same scene from the different points with synchronized time (using known techniques of the prior art). Features that may be detected and may be extracted from visual and audio information include but are not limited to: body language, face mimics, voice modulations. Those features (as used by the personal device of the user, or by a cloud application) may give information on a person's emotion and suitability of a particular occupation's options. In some implementations of the system (preferably all) privacy measures may be taken, for instance, restricting the capturing to the frames where there is an image (detected by image recognition from the prior art) or a voice of a user that requests capturing.

Downloading/Installing a Particular System to User Devices. After a system is discovered by a user, the user may request a system download to target devices used by the user. The request may come from any device that the user is operating at the time (i.e., not necessarily one of the devices employing the requested system). The user is preferably authenticated to use the Meta-Market (146) (see authentication methods) and to request the download. The user is also preferably authorized to perform a system purchase and download (note: in the case of supervised accounts, e.g., for children, some embodiments comprise system downloads and/or purchases which are restricted). Alternatively, a download request may come from a supervisor of the user (e.g., a supervisor of a child account for devices/user accounts that are used at home, typically parents; or a school teacher or other educator as a supervisor, for downloading systems for their students on devices used in an educational setting, e.g., school, university). Other supervisors comprise corporate account supervisors, e.g., when corporate IT downloads and installs systems on devices used by employees of a corporation. In such cases, the devices are used only in corporate environments or, alternatively, the devices have several accounts, e.g., corporate employee account, personal account, school PTA account. There is a distinction between a device and user account, due to, e.g., the option of bringing one's own device to an educational institution or to a corporate environment, thus allowing for different user accounts (e.g., home account, school account, corporate account) to be on the same device. In this case the request also may come via any device (not necessarily one of the devices participating in the requested system). The user, again, is preferably authenticated to use the Meta Market (146) (see authentication methods) and to request the download. The user is also preferably authorized to perform a system purchase and download.

Once a request to purchase and download is made, the request is transmitted to the Meta Market client (14213), and then further transmitted to the Meta Market server (14211). The Meta Market server (14211) reveals (from database or cache) the system information (by the system ID, provided from the Meta-Market client). Typically, the end user does not operate at the system ID level, and instead the user searches for the system functionality (see System Discovery)—or the user searched by the system name, or the user may browse over "related" systems (example: "people who bought this also bought or viewed . . . "), or the user may search by rating or by other parameters—and chooses one or several of the found systems. The search results are, however, mapped to the system IDs. The Meta-Market server (14211) designated by the user's account to receive/perform the system download/installation then recognizes that this system (by system ID) is to be installed. The Meta-Market server then begins an iterative process of the system installation per user.

The process of installation is iterative as not all of the devices needed for the system may be connected to the network at the point of installation decision. Some may be switched off, in airplane mode, out of network reach, not received yet by the user from manufacturer or shop, etc. There are several approaches to implementation of the iterative installation, for each device in the system. The Meta Market (146) establishes a connection with one of the devices in one or a combination of the following ways: (1) Any device registered with the Meta-Market (146), notifies the Meta-Market when it restores network connection (e.g., network connection may be: internet connection, for example, via cellular or WiFi, may be indirect connection, for example, via another device either providing a WiFi hotspot or redirecting network connection communicating with a device that needs a connection via low power alternatives like Zigbee (Zigbee 2005, Zigbee PRO also called Zigbee 2007), Bluetooth, NFC (under distance constraints), non-paring Bluetooth, in some cases ANT variations, other protocols or variations of the above protocols, etc.); (2) Alternatively, the Meta Market polls (according to known methods) the devices on which the system needs to be installed, each device designated at a specific period of time. The period of time may be adjusted algorithmically or manually. Once the connection is established, the Meta Market server requests the Meta Market client (14213) (located on the target device, where (a part of) the system applications is installed or located on a nearby device that acts as a muster (for cases of slave devices—e.g., very low power devices of internet of things)) to check whether the installation may be performed (started or renewed) at that specific time. If the installation may not be performed at that time, one or more of the following mechanisms are activated: (1) the Meta-Market client (14213) is responsible to notify the server when the installation is possible; (2) the Meta Market server (14211) polls again once a predefined (or algorithmically altered from time to time) amount of time has passed to determine whether the installation is possible on the device at that time. If the installation is possible (as reported by the Meta-Market client) on the device at a given time, it (i.e. the installation) either begins or resumes from the point where it was interrupted. For example, the installation was interrupted during the download stage by a network connection loss, or the installation was interrupted during the actual installation and configuration stage, for instance, by powering down the device. When the application or applications of the system to be installed on a particular device completes its download, installation, and configuration process, the Meta Market client (14213) on the device notifies the Meta Market server of the completion of the installation task. If there is no network connection, the Meta Market client saves the completion information and notifies the Meta Market server (14211) when the connection is reestablished (either directly or via a friend device service). If the installation is aborted, the Meta Market client saves the state of the installation so that it may be renewed from the point at which it was disrupted (or from the last saved point or a point close to the point of disruption; sometimes, when a particular installation of download sub-task is incomplete it is preferred to perform it again or undo and perform again, so such points are not always exactly the same). The Meta Market client may perform a variety of saves regarding installation status; for example, saving the installation stage once in a designated period of time, saving stages of completion, e.g., download stage, application1 installation, application1 configuration, application2 installation, application2 configuration, etc. The Meta Market client also assists the Meta Market server through the installation in a manner known or disclosed in the prior art (Android, iOS, etc.). For example: the meta-market client reports to the Meta-Market server that the installation on a particular device may be started or resumed; the meta-market client runs a client networking solution participating in downloading the application(s), the meta-market client also runs the installer software. Once the Meta Market server receives completion notifications regarding installation of all of a system's parts (of the current system installed for the current user account), it sends an activation request to all the system parts (applications (142.8)) on various devices. In some embodiments, the system activates on the go (i.e. automatically, even before all the other applications of the system are installed, without the need to be activated after all the parts of installation are complete).

Installations of system updates may adopt mechanisms similar to those discussed in the preceding paragraph. In the case of installation of updates, the old version of the applications may be kept along with the new version to allow the system to properly function in the transition period (which may be several seconds, minutes, hours, days, etc., depending on the system) until all the devices in the system download and install the new versions. Then, upon the completion notification, the Meta Market server sends a request to the Meta Market clients to try the new version, then the user or supervisor is asked to accept the new versions, and the system is tried; if the self-test works fine, the system works with the new version and the old version is removed. In some implementations, the old version may be left installed for a longer period of times to be able to use it as backup version (may be activated automatically upon failure of a new version).

Software Development Kits (SDKs) for Developing Particular Systems. Known SDKs (e.g., for Android, iOS, Tizen) may be extended to include an in-system communication layer. The motivation behind this layer is to centralize the decision on the default communication protocol to be used between particular types of devices (or devices located at a particular distance from each other, or devices with particular capabilities) within one system and place it on one of the following levels: (1) Application level of operating system, e.g., library on Android, resembling a level where OpenGL resides; (2) Meta Market client level (installed on devices), provided as a service application; (3) a regular application level, or (4) other levels. The in-system communication layer provides an API for different types of in-system communication between devices as well as for out of system communication of one device using the help of another device. The API may be non-related to the concrete implementation of the communication functions. The implementation of the communication functions may be provided by external libraries (either on OS level (e.g., library on application level of OS like in the case of OpenGL; or in kernel part of OS; or even using hardware optimizations of a particular device), or on applications level (e.g., service applications on Android, such as ffmpeg service)). Such an application may be one of the applications in the system and downloaded with the system if not present yet because of the installation of another system. The motivation is to give an abstraction layer for developers and allow for different communication options on different devices to take over different communication functions.

The following example assumes a library present on OS level. This library provides services and exports (to the applications) the predefined API for each type of communication such as: (1) Communication between a low power device like smart ring to a higher power device like mobile phone or smart glasses; (2) Communication between two low power devices like smart glasses and a stylus; (3) Communication of a low power device with the internet via a device with internet communication support (for example, via WiFi, cellular, or other hardware and software for network communication, etc.). For example: a smart ring uses another mobile or wearable device to communicate with the internet, e.g., to download an update or notify a metamarket server (14211) (different models of smart rings (42) may be either passive or active, so some are able to initiate communication and some not). The underlying protocols (in this example) are defined by the library, provided by the OS vendor.

Dynamic and Static Participants of a Particular System. While some systems may require specific sets of devices for proper functioning (static participants), other systems may be able to use and allow a particular set of devices and may require another set of devices. Those optional devices, when participating in the system, may reduce the system's power usage and improve the system quality, performance, usability, or another parameter of the system (dynamic participants). These dynamic participants are added to the system to improve functionality when present and available. Examples of static participants are located throughout this description. Examples of systems with dynamic participants include but are not limited to: (1) A gaming system comprising a mobile phone, a tablet or a wearable mask/gaming smart glasses (all those providing a function of a screen or other visual input), a smart ring for improving controls, and a desktop or laptop at home. When a user is near his/her home computer and the computer is available (idle or various available policies may be adopted by different systems), it takes a function of rendering the scene for the graphical game (for the same game—either taking the textures and commands (DirectX/openGL or similar) from the same game on the network (cloud), in this case buffering of the prepared (rendered and optionally resized) may be beneficial, or installing on the computer itself). It may help to save power on the mobile devices. In this case, the home computer is a dynamic participant of the system. It is not required for the proper functionality of the system. It has an application of the system installed on it. This application is activated when certain criteria are met, for example: (a) predefined distance or less from the other system elements (system elements being devices with other applications of the system for the same user); (b) a certain quality of the connection or better between the home computer and the mobile/wearable parts; (c) The home computer is in an available state; and (d) the system is currently activated on other devices of the system (meaning that the user is playing at the particular time); or, in another embodiment: (2) Friend devices with a camera application which, from time to time, are in proximity to a user and used to capture a picture of the user. The same friend devices do not participate in the system (even if activated) when they are not facing the user and in proximity to the user. They may join the system dynamically upon a trigger (example: capture request from the receiving user (one on his/her devices participating currently in an active system of this type)). Several friend devices may receive such a trigger at once and be activated to capture from different angles (see above, description of 3D capturing).

An additional example for use of dynamic elements: adding a dynamic participant to a system upon a low power event of one on the devices in a system so that the newly joined device will take over some power consuming tasks. This way, the overall system may work longer without recharging. This provides a method for power usage balancing between devices in a system.

Adding a dynamic participant taking over some functions or services previously provided by another application (possibly on other device) doesn't mean that the former application is excluded from the system, however it may reduce the number of provided services or reduce a workload in some of its services that are given by the dynamic participant.

Also, dynamic participants are on application level, so some applications may be static participants and some dynamic participants of a system even if installed on the same device. For example: a device that typically participates in a system as it runs a statically participating application, may take over additional functions dynamically (by activating dynamic participating application). In the case where one of the devices' battery is low, for example, if smart glasses battery is low, it may notify other devices in a proximity that have applications of the system installed (for example: one of the application (142.8) in a system may be a listener to other devices in a system) that it needs a particular functionality (e.g., WiFi). Alternatively, it may discover a relevant application (in proximity, has functionality and available to help this system and this user) via Meta Market (146) services or services provided by external internet (e.g., cloud) solution. Upon discovery, it sends a request for the discovered dynamic participant application to join the system, the request may be either accepted or rejected. If accepted, the dynamic participant may take over a particular functionality in whole or in part.

The same application (142.8) may act as a static participant in one system and as a dynamic participant in another system (142.2). For example, a camera application on smart glasses may be a static participant of the lecture notes system and a dynamic participant of a "take a picture upon a friend's request" system.

Using a Particular System. After discovering, downloading, and installing the system elements (i.e. applications) on the devices (see above), the user sees a system icon (or other input option) on the devices that participate in the system. The system is activated from the devices having the system elements (applications (142.8)) that are designated within the system as having the system activation option (note: this is designated in the system definition by the system manager in charge (142.14)). The system is turned off/closed from a device having the system elements that are designated within the system as having the system deactivation option (note: this is designated in the system definition by the system manager in charge (142.14)). There may be systems that may be activated or deactivated only from one device out of the devices participating in the systems. Alternatively, there may be systems with more than one device that may be used to activate or deactivate the system. There may also be systems that are activated from one device and deactivated using several (other) devices, using different combinations thereof. Dynamic elements/applications (142.8) of a system (142.2) (e.g., application on a smart glasses of a friend taking picture of the user) may be deactivated separately from the whole system as well (e.g., the user's friend has low battery on his/her smart glasses and is no longer interested in his/her device taking pictures of friends, so he/she deactivates this element of the system by deactivating an application (that serve as a dynamic part of the system) running on his/her smart glasses)). The other applications in a system may be notified about the deactivation/leaving of the particular system.

Services Provided by One Device to Another Device within a System. Different devices in a system may provide services one to another. Examples include: (1) when a user plays a rendering of a 3D scene, this is done by one device in the user's bag, presented to the user on a screen of another device, wherein network services to the internet are provided via a third device; (2) User requests other devices, for example several SLR cameras at his/her home, to take a picture or record a video (2D or 3D, see previous implementation details on revealing information for 3D capturing from several 2D capturing devices) and send the outcomes to a cloud or to a home computer device for further processing. The user may request it, e.g., from a remote control smart ring. Such examples require regular system elements (applications in a system) to be installed and activated on the various different devices.

Another example is providing WiFi service to another application of a system, possibly on another device (see examples with smart glasses above and mobile phone).

Another example: user requests another device (wearable or mobile device in the hands of another person, or a public device such as a security camera, if it is in an available (idle, less than x % loaded in CPU, ISP (image signal processing unit) or networking, etc.) state) to take a picture or record a video of that user, wherein the other device does not save the outcome picture/video but sends the outcome picture/video to the user's device.

Dynamic services may also be provided by external elements (applications installed on different devices of other users (under another user identity) which interoperate with the same system). For example, adding to the example above, system elements that are installed on security cameras. The application (142.8) on public security cameras may be installed under a public user of the security cameras (typically, different from private user identities of the users of this system services). The image/video capture images and optionally other features (e.g., voice modulations, facial expressions, see more examples in a smart glass to smart glass system description), provided as a paid or free service or as an advertising campaign part or on other commercial or commercial term. The other elements of the system, typically, are installed under a regular user identity of a service user.

Service Access Restrictions. The parts of a system that provide services but are installed by users different from the user receiving the service may be restricted via definitions of who may receive the services (i.e. to whom those services may be provided). Such restrictions may be at least one of the following types: (1) only systems under the same user, (2) systems under the same user and under friend users wherein "friend" may be further defined (e.g., standing for a friend on any kind of social interactions system—social network, friend option on the meta-market or any other market, etc.), (3) a predefined group of users that are defined/accepted either by user providing the service or by this user supervising the other user, (4) everyone meeting a particular location criteria, (5) everyone meeting another particular criteria (e.g., paid for the service, above a particular age, willing to accept the service), (6) everyone asking for the service, or (7) simply everyone. (8) In some implementations, the restrictions also resemble Unix style permissions (allowed for: all, group, user). The restrictions may vary from user to user and from system to system.

Restrictions Placed by User on Accepting a Service. Users may place restrictions on accepting a service from an application (142.8) running under particular users. Examples: white list approach, blacklist approach, either static or dynamic. Black lists may be taken automatically (or supervised, i.e. checked by parents, etc.) from a spam/malware or dangers lists services or similar. White lists may be taken from social service analysis either performed and/or provided by the meta-market (146) or by another accumulating service or taken directly from social services (example: Facebook, WhatsApp, Google+, LinkedIn, school applications and systems, etc.). Alternatively, some users may decide on supervision (useful for kids accounts), meaning a supervisor account (e.g., a parent) decides upon the restriction. The behavior of applications under a particular user may be analyzed by service that may accumulate reports (e.g., from meta-market clients or from system elements (142.8), etc.). The restrictions may be also placed for particular functionality and access requirements that are required by foreign user applications.

Functionality Migration from One System Element/Device to Another and Back. Any application provides a set of services (may be empty or not) to itself, other applications (the list may vary depending whether the other application that receives a service is under the same user or not, within the same system, outside a system, inside different the system, etc.) and other systems. These services may migrate from one application/device (as other device may start providing this service) to another based on internal (within the system) and external (outside the system) events. The services may migrate back if the state changes. Alternatively a service may continue migrating to other providers (applications (142.8)). For example, as discussed before, based on power levels of different/devices (running applications of a system) and based on a predefined policy, the functionality elements (serviced provided by application) may migrate and be provided by different devices (application on those devices) comprising the system, or such services outside the system in some cases. Thus, e.g., when smart glasses have low battery and a mobile phone has normal battery state, WiFi (or other power consuming) functionality migrates to the mobile phone (an application (142.8) on a mobile phone starts providing the service), and the smart glasses stops providing this service (or in some cases reduce the load of the service, for example, takes each $3^{rd}$ request); The system (142.2) in use is updated (in some implementations, it may mean updating application/s within a system that is/are responsible to redirect for the correct service provider), so that its applications (142.8) know for whom (user, application type, device type, power type. Etc.) the service is provided and by what application (142.8) and running on what device. The element (service) may later migrate back (or to yet another available device) if the device's state changes (in this example, when situation with power changes).

Services within an application that are activated in the presence of another particular application of a system or application outside a system. Applications (142.8) may have services (service types may be at least one of the following: services provided for the same application, service provided to a human user, service provided to other applications within the system or applications outside a system, a part of an application flow, and other services) that are activated only in the presence of another application, exporting a particular activation service (later referred to as "activation application"). Presence in different implementations may mean either (1) installed on the same device as the application it activates; or (2) being a part of the same system (in a typical implementations adopting this approach, the two applications are a part of one active system); there may be other implementation where presence means being on a proximity and running under the same user, etc. Various security restrictions may be placed on the activation feature, examples: only activation applications running under the same user may activate the service; some users are allowed to activate some services, white lists, black lists, user notification on any or some (according to policy) such activations typically before the activation, asking for user permission. To simplify the security, privacy and anti-malware configuration for the end user, in different implementations, there may be predefined policies at device/OS vendor level, at system (142.2) level, and at application (142.8) level. There may also be antivirus applications that may be installed on devices either separately or as a part of a system (142.2). When every system (142.2) that may potentially need antivirus/anti-malware application includes a list of options and installs one of the applications on a list is no one of them are already installed, this may be effective in ruling out security problems. In some implementations, the activated services may run other services and receive feedback from them (example: via shared memory). Practical examples include but are not limited to: adding educational functionality to off-the-shelf addictive games for extrinsic motivation of students and improving a student's mood. That may be done by incorporating into those games (for instance by adding this feature to default OS level or application level libraries) services that remain silent until activated by a particular activation application. That way, those addictive applications may be incorporated as parts of educational systems (142.2) with activation applications that activate services that provide a homework quiz (for a limited time) and return the quiz result (as an accumulated number according to predefined protocol), so that the quiz results (or any other educational activity results) may affect the scores and levels of the addictive game.

A particular system (142.2) may include a list of options of applications for some of its application type (142.4) and a winner application for this type. The feature may be used as follows: if none of the applications on the list is already installed on the users' devices, the market is trying to install it, the market will install the winner application for that type, otherwise the system will work with the already installed application. Practical usage example: a user has a system with already installed antivirus application on one of his/her devices, the same user installs another system that also needs the antivirus application on the same device. The first system chooses one antivirus application to be the winner application, the second system chose another antivirus application to be the winner for this application type (for instance by user voting), but the winner antivirus application of the first system (that is already installed) is in second place on the list of the second system and works well with the second system. The presented feature reduces, in this example, a number of installed applications as well as number of running applications when several systems are activated simultaneously, thus reducing the needed storage, CPU, and RAM memory on devices.

Further practical examples of systems requiring a set of apps running on one or different devices in order to interoperate and provide services to a user include but are not limited to the following:

A system, comprising two or more smart rings and a mobile phone for implementing micro-payments, wherein the proximity (using NFC) of two smart rings coupled with an input (e.g., signature) using the screen of mobile phone, initiates the micropayment transaction.

A system comprising a smart ring (NFC based key or a smart ring with RF ID or other low power communication that is applicable) and an embedded device in a door lock, wherein proximity of the ring to the lock unlocks the door. Alternatively, a lock application (142.8) may be incorporated into security camera or other camera device or other device that may capture visual information and a key may be a specific QR code or barcode or schematic painting or a picture (example: a schematic painting on a child's bag and clothes may open a door when a child comes from school). The lock may accompany another lock (for example: regular lock) and may work in particular time (hours, days of the week, dates), for example "only in working days at a time when kids return from school: so this painting, even if stolen will be useless at nights. The lock may also be a two- or several-phase lock, meaning it is activated after an active trigger, for instance, the child is calling parents and parents activate the lock.

A system comprising a smart ring and smart glasses, wherein lecture notes are recorded by the glasses while the ring is used as to control a camera (and a camera zoom) of the smart glasses, or alternatively records any writing which is performed by the user during the lecture. See FIG. 15 and its description in the referenced provisional application for the further details on this system. Note that a camera zoom may be controlled by sliding a finger (or moving a ring, note: moving a ring may be favorable in particular types of smart rings, for example gesture powered smart rings) in one direction to enlarge and in another (example: opposite) direction to "make smaller" or far.

For several types of smart rings description details, please refer to the provisional, see figure descriptions for FIGS. 3.A, 4.A-4.E, 5, 6, 7.A-7.D in the referenced provisional application.

A system comprising two pairs of smart glasses and two smart rings as remote control instruments. The system is activated for a particular time period and allows a first user to take pictures of him/herself by controlling the smart glasses worn by a second user when the first and second users are in proximity to each other. See above: This system may benefit from the "indicator screen" (1601) (sometimes also called indication screen (1601), herein)—one of the embodiments of the present invention, allowing a stranger to know whether a smart glass is currently recording (photo/video/emotional or emotional features). It allows to understand this even in a crowded place. This may help the smart glasses social acceptance in general and in particular, an acceptance of systems that run on smart glasses and involve recording.

A system comprising a tiny molecular analyzer chip (for example: the chip that is incorporated in SCiO, a handheld molecular analyzer) incorporated into a smart ring (see detailed description of smart rings in the referenced provisional application, example of a connector between them may be: a particular type of USB), and smart glasses (or other wearable or mobile device) for output of the information sent and revealed by the molecular analyzing smart ring. Additionally, a pocket smart storage device may be used to store the information obtained, and furthermore, a mobile phone (or other network enabled device) may be used to transmit the gathered information to a cloud. Based on the same or other configurations, a system for plant illness diagnostics may also be built.

A system for monitoring caloric intake may also be built based on the same configuration. For example, a user wearing a smart ring with a molecular analyzer may download a system, keeping his/her ring active at all times except when the user is asleep (see references for how to reveal sleepiness) or otherwise restricting a time and level of the ring activity to reduce power consumption. When a user approaches a plate or other food arrangement for eating (food is detected by the molecular analyzer chip and arrangement is detected by computer vision algorithms that run on images captured by smart glasses (or other head-mounted device)), the smart ring actively passes (via local low power communication, e.g., Bluetooth, Zigbee, etc.) the smayned information to another element of the system (e.g., smart glasses to present it to user, external network (WIFI, cellular or other) enabled device to upload to cloud). Additionally, shoes, having a unit for measurement of fitness activity (example: NikeFuel) report such activity via low power local network to other elements of a system, for instance to smart glasses to present to the user and to a mobile phone or other network device (WIFI or other external network) to upload to cloud/internet. Smart glasses with WiFi may be used also for uploading if battery life is less of a concern. The system gathers the caloric intake and calories burned information without requiring an active user interaction or a user's attention. The display of the collected information to the user is optional. Thus, the system analyzes information (numbers and times of intake and burn of calories, as well as other patterns) and gives the user advice (e.g., in notification form) based on the information collected. Notification time and frequency may be configured by user.

A system comprising a universal card (example: Coin universal card) technology incorporated into a smart ring. Other elements of this system comprise smart glasses or another device with output capabilities, that presents information to the user, and a "friend device" element—application (142.8) on a friend device—(running under a general user of the shop or alternatively, in some cases, under a user of a service provider whom the user pays) comprising a pad for signature for a purchase. The "friend device" element/application (142.8) provides services to the system based on a trigger event. In this example, the trigger event is activation of the payment process via the smart ring with incorporated universal card (or other payment technology, or smart ring that uses payment technology from other device, like Paypal on a mobile or wearable device, and activates it from the ring). From the user's perspective, activation comprises pressing on a button or using another actuator, or a combination of proximity (example: use NFC or similar network communication protocol (SW and HW), where existence of communication may reveal proximity, or proximity sensors) and actuator. In some cases, this example may be combined with biometrics, e.g., a fingerprint for locking a smart ring—for example: a user provides a correct fingerprint, activates an actuator initiating payment, wherein the user is near the pad, so that the pad joins the system as a "friend device", with application/s (142.8) providing, in this example, signature services.

Note: in the current state of the art, there are systems reducing power consumption, by revealing (see prior art) whether the user is looking at the screen. In new wearable devices, it becomes harder to reveal the usage state (using or not) and whether the device may hibernate or otherwise reduce power consumption on a momentary basis in the same way. In even newer wearable devices (examples: smart rings, smart watch, smart glasses), all those devices are typically located (wear on a body or head, etc.) in a way allowing to reveal using biometrics (heart rate (possible on at least: smart ring, smart watch, smart bracelet, smart glasses), eye blinking rate (possible at least on smart glasses)) whether to hibernate or enter another low power consuming mode. To reveal a level of sleepiness methods if the prior art (described in background section) may be used, for example, the following method may be used, described in prior art "Blink behaviour based drowsiness detection—method development and validation, Applied Physics and Electrical Engineering Reprint from Linköping University, Dept. Biomedical Engineering, LiU-IMT-EX-04/369 Linkoping 2004 Ulrika Svensson which is incorporated here entirely by reference.

In another example, a dynamic element of a system provides services based on an internal event happening within one of the system devices, wherein the dynamic element further exports (e.g., broadcasting or multicasting) a need or a function to a friend device. For example, upon one of the devices in a system reaching a particular low battery level (or percent), an internal system notifies a potential friend device that assistance is needed, and if capable, the friend device joins the system, taking over some functions.

A system (142.2) that teaches accurate and fast handwriting, comprising a pad (e.g., drawing pad, tablet, mobile phone or other computer device incorporating touch screen or touch pad) and a stylus (either passive or active) and application (142.8) running on those devices. This system comprises a software application for the touch screen/pad (which may be shipped or downloaded) and hardware (i.e., the stylus) that is shipped upon a purchase of the system. As one of its features, this system incorporates a moving text in handwriting (or other type of writing, e.g., print or picture) in any language. The text moves in a direction of writing of the chosen language. The speed of the text movement changes and adjusts itself to the speed and accuracy of the current user coping with the task of writing over the moving text (accuracy is measured as a level (examples: % of the line match, accumulated error over a letter or word or picture or a group of words, etc.) of matching between the line drawn by a student dynamically and the line presented to the student, for example, in a moving test or in a static picture). The application provides the user (e.g., student) with gradual feedback (based on current results of this student, or compared with other students, within or using the system), increasing requirements for accuracy (the maximal allowed distance between the picture/letter line and a line of a student) and speed as the user progresses.

Additional remote control ring examples include but are not limited to using a smart ring of the present invention or any other smart ring capable of controlling a camera enabled device (smart glasses, camera, head mounted computer device with camera, wearable computer device with camera, wearable camera, and so on) to control a camera zoom on of the camera.

Also, some implementations of the remote control device (42) (smart ring, bracelet or watch) and camera wearable device (or other device) of the present invention may incorporate a freescale Kinetis KL02 Chip-Scale Package (CSP) (ARM Powered MCU) or a similar ultra-low power and ultra-small ARM, ARC, MIPS or other processor powered MCU.

Further embodiments are encompassed by the following examples:

Systems of devices wherein the sensor coupled to one or more devices is a thermoelectric sensor that responds to a temperature or to a temperature gradient of an object using conduction, convection, or radiation, and wherein the thermoelectric sensor consists of, or comprises, a Positive Temperature Coefficient (PTC) thermistor, a Negative Temperature Coefficient (NTC) thermistor, a thermocouple, a quartz crystal, or a Resistance Temperature Detector (RTD). Alternatively, systems wherein the sensor consists of, or comprises, a nanosensor, a crystal, or a semiconductor, or wherein: the sensor is an ultrasonic based, the sensor is an eddy-current sensor, the sensor is a proximity sensor, the sensor is a bulk or surface acoustic sensor, or the sensor is an atmospheric or an environmental sensor.

Systems of devices where the sensor controls a camera zoom on the controlled device. Alternatively, systems may comprise a sensor that is a photoelectric sensor that responds to a visible or an invisible light, the invisible light is infrared, ultraviolet, X-rays, or gamma rays, and wherein the photoelectric sensor is based on the photoelectric or photovoltaic effect, and consists of, or comprises, a semiconductor component that consists of, or comprises, a photodiode, a phototransistor, or a solar cell. In some embodiments, the photoelectric sensor is based on Charge-Coupled Device (CCD) or a Complementary Metal-Oxide Semiconductor (CMOS) element.

In other embodiments, the sensor is an electrochemical sensor that responds to an object chemical structure, properties, composition, or reactions.

In yet other embodiments, the sensor is a physiological sensor that responds to parameters associated with a live body, and is external to the sensed body, implanted inside the sensed body, attached to the sensed body, or wearable on the sensed body. The physiological sensor may respond to body electrical signals and may be an EEG Electroencephalography (EEG) or an Electrocardiography (ECG) sensor. Alternatively, the physiological sensor may respond to oxygen saturation, gas saturation, or a blood pressure in the sensed body.

In other embodiments, the sensor is an electroacoustic sensor that responds to an audible or inaudible sound. The electroacoustic sensor may be an omnidirectional, unidirectional, or bidirectional microphone that is based on the sensing the incident sound based motion of a diaphragm or a ribbon, and the microphone may consists of, or comprise, a condenser, an electret, a dynamic, a ribbon, a carbon, or a piezoelectric microphone.

In any of the above embodiments, each of said devices may be connectable to be powered from a DC or AC power source, further comprising a power supply housed with the respective device enclosure, and coupled to be powered from the power source and to power at least part of its respective device. The power source may be a primary or rechargeable battery, or the AC power source may be a main AC power, wherein the respective device further comprises an AC power connector connectable to an AC power outlet. The power source may be an electrical power generator for generating an electric power from the phenomenon or from a distinct other phenomenon. Alternatively, a single component may serve as the sensor and as the electrical power generator. The electrical power generator may be an electromechanical generator for harvesting kinetic energy, or the electrical power generator may be a solar cell or a Peltier effect based thermoelectric device.

In any of the embodiments, the wireless transmitter and the wireless receiver may communicate over a network, wherein the network is a WWAN, a WLAN, a PAN, a BAN, a home network, the Internet, or a personal area network (PAN). Additionally, the PAN may be a Wireless PAN (WPAN), and based on Bluetooth or IEEE 802.15.1-2005 standards, or the WPAN may be a wireless control network according to, or based on, Zigbee, IEEE 802.15.4-2003, or Z-Wave standards. The network may be a Wireless LAN (WLAN), according to, or based on, IEEE 802.11-2012, IEEE 802.11a, IEEE 802.11b, IEEE 802.11g, IEEE 802.11n, or IEEE 802.11ac. The network may be a wireless WAN over a licensed or unlicensed radio frequency band, wherein the unlicensed radio frequency band is an Industrial, Scientific, and Medical (ISM) radio band. The wireless network may also be a WiMAX network, according to, or based on, IEEE 802.16-2009. The wireless network may also be a cellular telephone network, wherein the cellular telephone network is a Third Generation (3G) network that uses UMTS W-CDMA, UMTS HSPA, UMTS TDD, CDMA2000 1×RTT, CDMA2000 EV-DO, or GSM EDGE-Evolution, or wherein the cellular telephone network is a Fourth Generation (4G) network that uses HSPA+, Mobile WiMAX, LTE, LTE-Advanced, MBWA, or is based on IEEE 802.20-2008.

In addition to the above disclosure, the present invention further comprises a mobile, wearable, or other device which reports its status, capabilities and activities to the network in a way that allows the nearby devices to alert their users in case of a potential privacy or security invasion. It also allows publicly used devices to communicate the privacy and security violation in a way that will eliminate unintentional or seamless violations to the levels before the wearable and mobile devices revolution.

In this aspect, the current invention addresses the problem by providing methods and systems for: indicating the current security and privacy level of a device (example: indicating that smart glasses are currently recording, may record in a current location, have capabilities to record); communicating the current privacy and security level to other device and aggregating the policy and security levels of a particular place and optionally restricting mobile, wearable and other devices by policy. The current invention also proposes ways for indicating the device state and capabilities in a humanly noticeable way.

Figure 12:
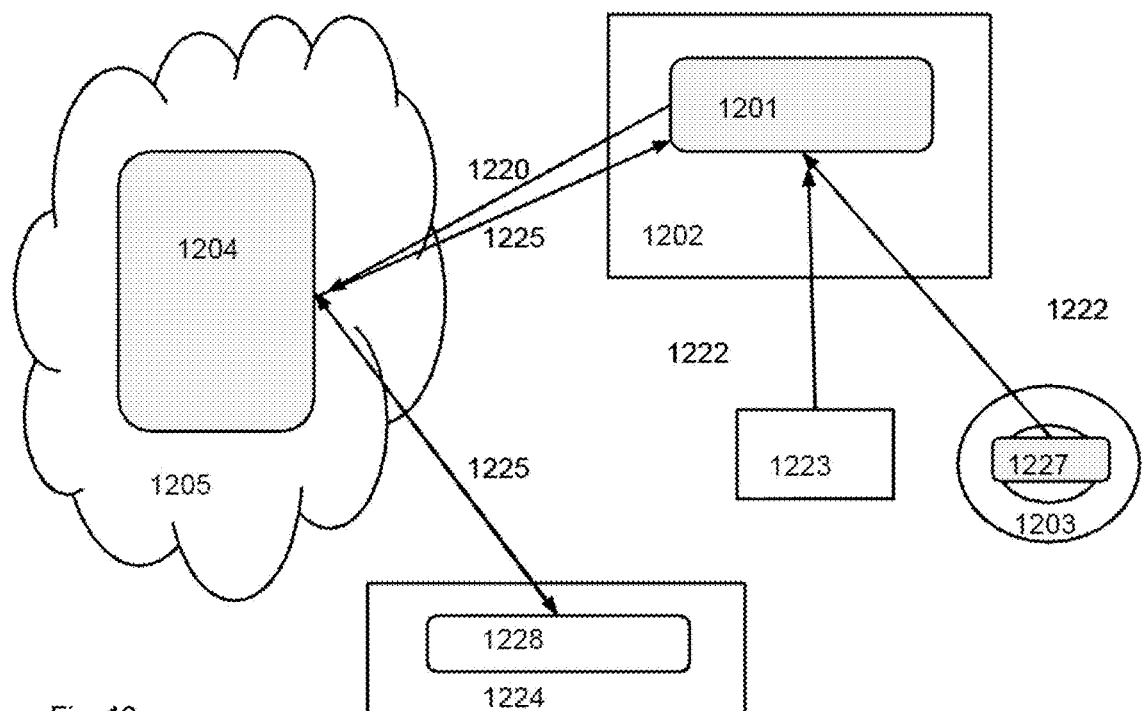
FIG. 12 illustrates an event data recorder on a wearable computer.
Figure 13:
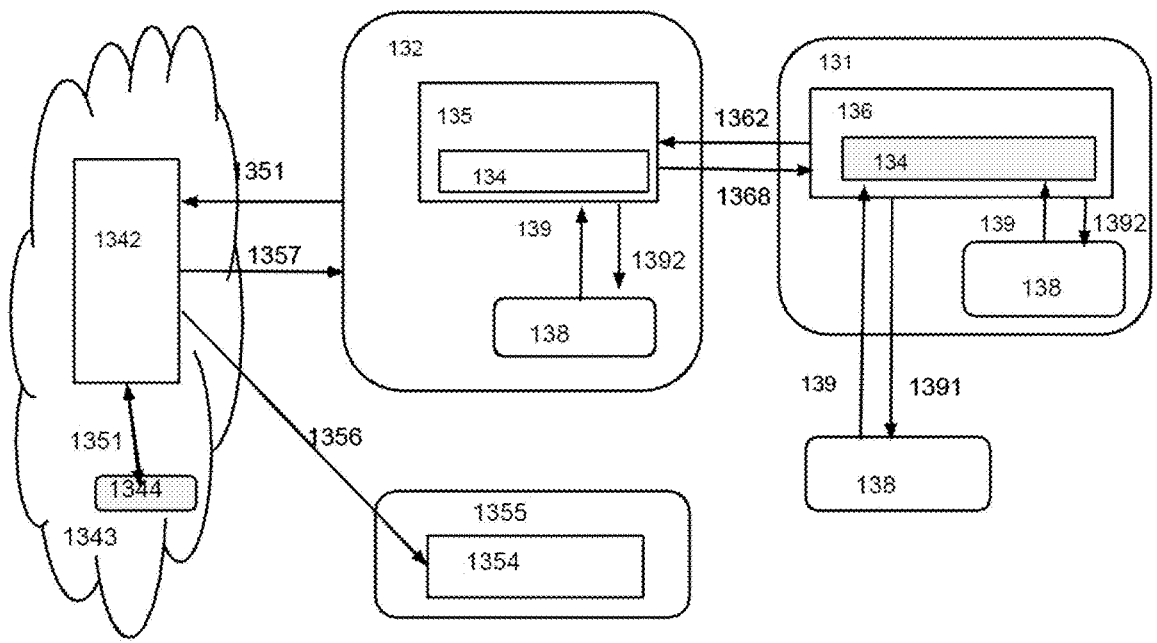
FIG. 13 illustrates an emotions triggered event recording.
Figure 16:
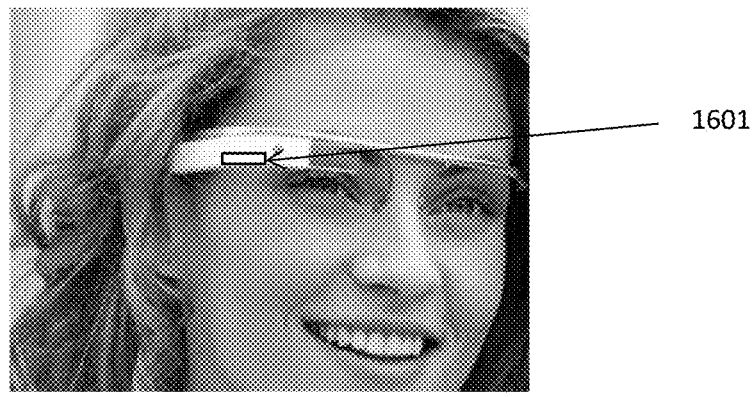
FIG. 16 illustrates a low power indication screen (1601) incorporated into smart glasses to indicate the privacy level, for example, to indicate that the glasses are recording video.

A low power indication screen (1601) may be used on wearable and mobile devices to let people around see information on the device, such as: activities, capabilities, policy restrictions, privacy or security level. The indication screen may be split into several areas, each with its own meaning. The indication screen may be color and picture coded and may be adjusted to suit colorblind people. The screen may be implemented as electronic ink, for example Triton 2 E-ink, although there are other possibilities, examples: array of differently colored LEDs (Light-emitting diodes), LCD, etc. A part of this screen or an additional screen may remain non-functional so that it may be used for self-expression pictures. The idea resembles the car lights concept applied to the mobile and wearable domain. See FIG. 16.

Figure 17:
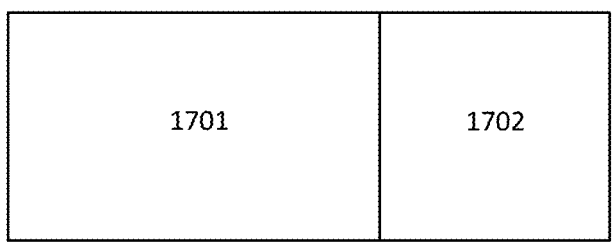
FIG. 17 illustrates how a wall indication screen separately indicates a moderate privacy level (1702) and a good communication level (1701) (thus, people do not need to do so using, for example, a mobile device).
Figure 18:
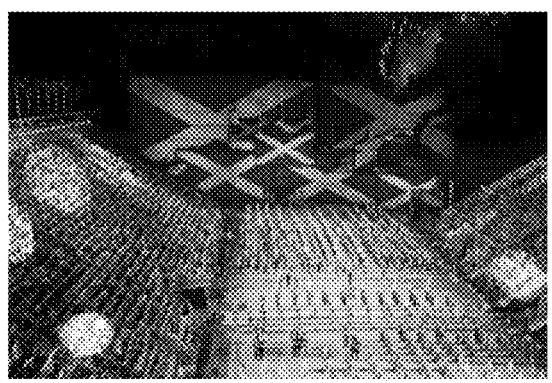
FIG. 18 illustrates projectors spotting out local place rules violators.

Furthermore, large indication screens (1601) are used in closed locations like: cafes, theatres, conference rooms or public open places. Such a screen may be placed on a wall and be combined with computer device capable of display control and communication. Example: simple android device with ARM processor and WiFi. Communication may be based on other protocols, like Zigbee, Bluetooth, etc. See FIG. 17. Where appropriate, for instance in bars where recording is prohibited, wall indication screen devices may be incorporated with a light projector robot that may spot out the rules violator by a light beam (See FIG. 18).

Also disclosed are devices reporting information on status, capabilities, and activities (10) or privacy level (8) to a single spot (11) that aggregates information from different devices in the area and informs subscribers in the same area about the aggregated privacy or security level. People may be motivated to report their device info by giving the aggregated information only to those who report their device info. Aggregator may be either in a local or in the global network. Implementation may be an app or code incorporated in OS (better option in terms of security) that communicates with server side in cloud that aggregates information and reports it to all the subscribers in the same area. Alternatively a single spot may be local and implemented in a variety of ways ranging from local device in a Bar every device should pair with via Bluetooth. Another option is filter like software on WiFi spot (proxy software placed after a packet is received from user connected to the WiFi spot and before the packets are sent out). See FIG. 19.

Alternatively a local single spot approach may be implemented using security cameras and image recognition to reveal and then aggregate levels designated by indication screens (1601). Indication in unseen light spectrum may be also considered.

One of the concerns of global network single spot approach is a need to transmit one's current location. It may be solved by transmitting a result of one way function applied on the location coordinates so that the aggregation spot may match the location with others residing in the same place but the location would not be transmitted over network or communicated to the aggregator.

Another option is to communicate privacy and security level (8) in a distributed local network without creating a single managing spot. Any device in a particular place may broadcast it level (8) to any other device in the area and aggregated level is calculated by each device for itself. Communication may be implemented using RF. Communication may be encrypted to allow only the service subscribers to receive information. See FIG. 20.A.

In order to designate that a person prefers not to be recorded, methods may be based on gestures, indication screen (1601) colors or pictures, RF communication of a device, or physical or virtual sign, for example. See FIG. 20.B.

Users are motivated to indicate a privacy level due to at least the following reasons: (1) One concern is privacy of the device user that provides information. This invention addresses it by not communicating location in a reversible way, broadcasting encrypted information on the privacy level. (2) Other concern is laziness: "Why should I do something?" Making this option a default on OS level and making it opt-out address this concern. Designating, for instance on an indication screen that the option is switched off may provide a social basis for system acceptance.

The indicator display or indicator screen is a display (LCD; electronic ink, for example Triton 2 E-ink screen among other possibilities; array of differently colored leds or other display type among other possibilities) that displays a particular color or picture as an indication of a state, a set of capabilities, a policy level, a privacy level, a security level or action taken (or any other information that is important to communicate as a simple sign) by the device it is incorporated in. Example: such an indicator screen is incorporated into smart glasses or other wearable, mobile or other device (example of location: on the device surface on a part that may be seen by people during the device usage) and indicate on it that the device is recording still or video or audio by one color, by another color, it may indicate that the device is capable of recording under the current policy, by yet another color, it may indicate that the device has recording capabilities that are disabled by policy.

The indicator screen may also indicate an aggregated privacy or security level of devices located in a particular place. In this case, it may either be incorporated into a device—either one of the monitored devices or another device or be located outside those devices accompanied by hardware and software allowing wireless connection (WiFi, Bluetooth, Zigbee, cellular among other possibilities) as well as instruction capabilities (example, a simple microprocessor among other options). Examples of indicator screens reflecting the aggregated information include but are not restricted to, such a screen on a wall of a place that is monitored, it may be of a size easily seen by people in the place. The screen may be attached to hardware and run software allowing for communication with either the devices or with computer device that aggregates information from all the devices in that place. Alternatively, such a screen may be incorporated in a device, for instance a smart table, smart watch, smart bracelet, smart ring or other wearable or mobile device of a person responsible for privacy or security in a place.

Regarding the privacy and security level communication: In order to be able to collect the state, policy level, privacy level, security level (or other capabilities or features) information from various devices, some degree of cooperation of the monitored devices is needed. The technological part may include software solution, or a combination of hardware and software solution. It is more secure to add a software part as a part of operating system it will reduce a number of people capable of removing it. Taking into account the possibility to change the operating system (and even rewrite it in part or at all, which is especially easy with Android as it has opened sources), the technological part may be accompanied by laws declaring responsibility of a device user that removes this policy/privacy/security monitoring capabilities from the device and enters with that device (turned on) places that require policy/privacy/security monitoring. This is an optional part and may replace laws that are proposed against the new technology.

The present invention comprises a system of devices for completing one or more tasks by a user, comprising: a first hardware device, said first device running at least one application related to said one or more tasks, a second hardware device, said second device running at least one application related to said one or more tasks, a software, said software being in the form of applications which are installed in part on said first device and in part on said second device, based on the applications required to perform a function of each device within said system, and a means for wireless communication among said first and second devices, wherein said means for communication enables control of said second device by an input on said first device, wherein said first and second devices interoperate via said software to complete the one or more tasks for the user.

Other embodiments further comprise one or more additional hardware devices, said one or more additional devices running at least one application related to said one or more tasks.

Other embodiments comprise the above, wherein said first, second, and one or more additional devices are coupled to two or more different users.

Other embodiments comprise the system as described above, further comprising a metamarket, said metamarket enabling a user to search for, purchase, download, and install a product, said product comprising one or more applications running on the first and second devices, and said metamarket further enabling a vendor to update and upload a new version of said one or more applications to a shared space (i.e. metamarket), further enabling the user to download said new version of said one or more applications.

Other embodiments comprise the system as described above, wherein one or more applications is a static application of the system and two or more applications are dynamic applications of the system, each said dynamic application taking over a function of an underperforming dynamic application, said taking over being based on a location and an availability of applications and any devices in addition to said first device.

Other embodiments comprise the system as described above, wherein one or more applications is a static application of the system and one or more applications is a dynamic application of the system, said dynamic application being capable of taking over a function of a static application on a given device based on a location and an availability of an entire system of applications.

Other embodiments comprise the system as described above, wherein said one or more additional devices comprises only dynamic applications, said dynamic applications engaging only when the same application underperforms on another device of the system.

Other embodiments comprise the system as described above, wherein said first hardware device further comprises a sensor that generates a sensor data in response to a first phenomenon, a first processor executing the software/applications installed on said first device, the first processor being coupled to said sensor, a wireless transmitter coupled to said processor for transmitting over the air said sensor data, and a first enclosure for housing said sensor, said first processor, and said first wireless transmitter; and wherein said second hardware device further comprises an actuator that affects a second phenomenon in response to an actuator command, a second processor executing the software/applications installed on said second device, the second processor being coupled to said actuator, a wireless receiver for receiving over the air the sensor data from said wireless transmitter, the wireless receiver being coupled to said second processor, and a second enclosure for housing said actuator, said second processor, and said wireless receiver, wherein said first and second enclosures are wearable, and wherein the system operates to affect the second phenomenon in response to the first phenomenon.

Other embodiments comprise the system as described above, wherein the first enclosure is a ring or a watch, and the second enclosure is a head-mounted device.

Other embodiments comprise the system as described above, further comprising a metamarket, said metamarket enabling a user to search for, purchase, download, and install a product, said product comprising one or more applications running on the first and second devices, and said metamarket further enabling a vendor to update and upload a new version of said one or more applications to a shared space, further enabling the user to download said new version of said one or more applications.

Other embodiments comprise the system as described above, wherein said first enclosure is worn by a first user and said second enclosure is worn by a second user within a given distance from said first user, said first user capturing a self-image by controlling said second enclosure via said first enclosure.

Other embodiments comprise the system as described above, wherein said metamarket further enables multi-stage updates, said multi-stage updates allowing a user to perform said one or more tasks via an old version of one or more applications until the new version is completed/approved.

Other embodiments comprise the system as described above, further comprising an abstraction layer for communication between the devices of the system.

Benefits and advantages of the present invention include: (1) the capability of use by masses as it may be made a default (opt-out) option on widely used devices; (2) offering a way to understand the device capabilities; (3) offering a way to understand whether the device user is activated particular capabilities that impose a privacy or security problem (defined by the individual customer or a location's policy); (4) customizable lower power solution for the indicator screen; (5) may indicate a current policy/security/privacy level of a device in a way easily seen and understood by people; and (6) may indicate a current policy/security/privacy level of a device in a way understood by devices. FIG. 14.3.2 illustrates deleting a system (with or without applications the system uses) from the Meta-Market (146).

Figure 24:
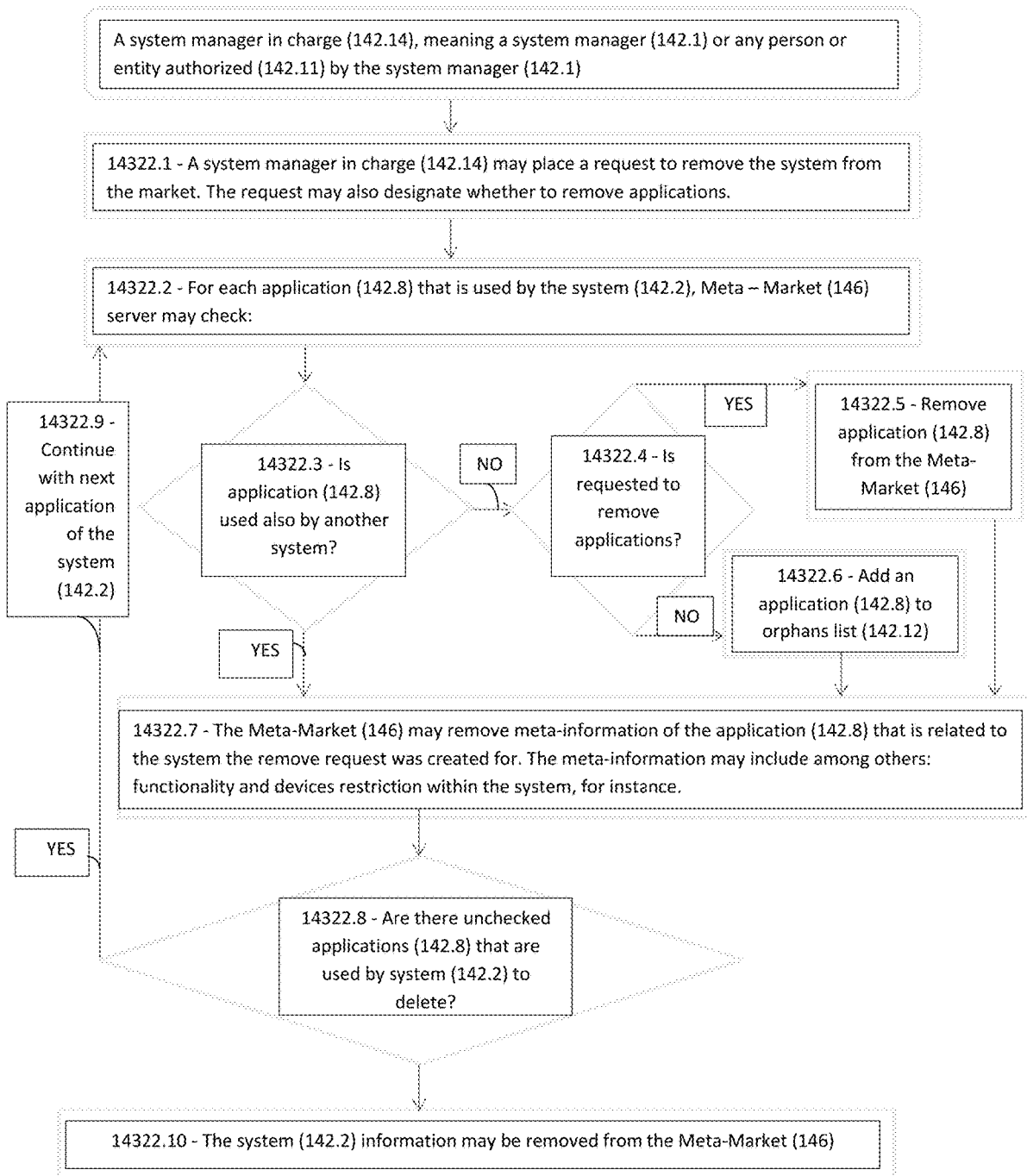
FIG. 24 illustrates a method of deleting a system (with or without applications the system uses) from the Meta-Market (146).

Additional Flow Charts. FIG. 24 illustrates a method for deleting a system (with or without applications the system uses) from the Meta-Market (146). Specifically, the system manager may place a request to remove the system from the market (146). The Meta-Market (146) server may go over the list of applications that are used by the system and for each application checks (tests) whether the application is used also by another system. Either a policy or information accompanying a system removal request may contain an indication whether to remove applications (142.8) used by the system if they are not used by other systems. To remove applications: for an application that is not used by another system, the system may add an application to the unreferenced application list or orphan list (142.12) (or any data structure, preferably persistently stored in DB). Thus, those applications may be easily removed from the Meta-Market if a "Meta-Market garbage collector" is activated. To not remove applications: if the application is not used by another system, it is removed from the Meta-Market, then its meta-information (functionality and devices restriction within the system, for instance) related to the system is removed. Then, the system may delete meta-information (functionality and devices restriction within the system, for instance) related to the system. After going this way over the list of applications used by the system, the system information may be removed from the Meta-Market. Note: Checking (or Testing) whether an application (142.8) is used also by another system may be implemented, for instance, using a reference count (using known methods as disclosed in the prior art).

Figure 25:
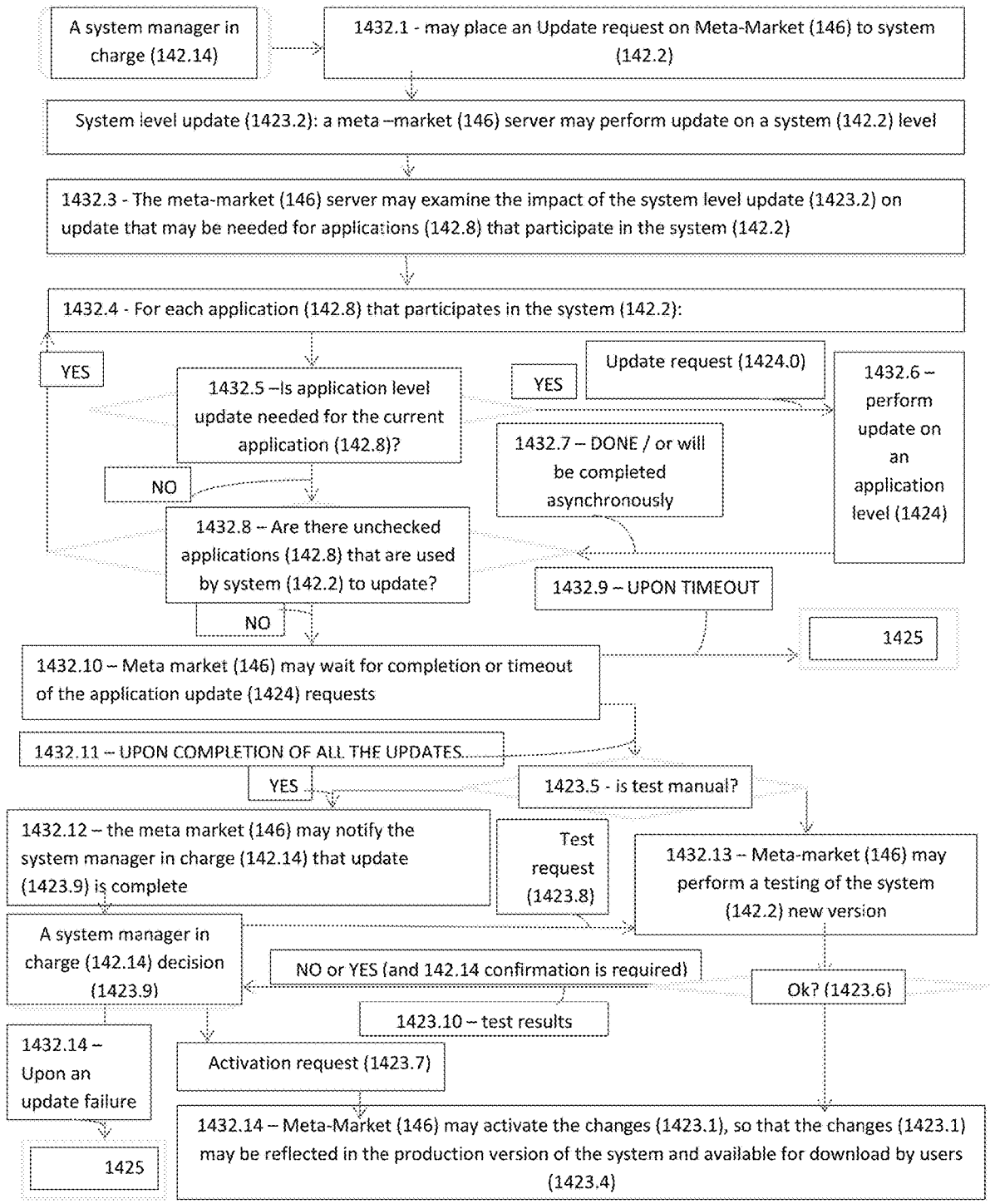
FIG. 25 illustrates a method of updating a System (142.2).

FIG. 25 illustrates a method for updating a System (142.2). A system manager in charge (142.14), meaning a system manager (142.1) or anyone authorized (142.11) by the system manger (142.1) of a system (142.2) to be updated, may perform a system level update (1423.2). System level update (1423.2) may include, among other things, the following changes: Any change of information on the system level, any redefinition or update to the application types, and any redefinition or update to application types restrictions or requirements. If the system level changes require an application level update (1424), the application vendors may receive a notification and so have an opportunity to update the applications. The system manager may set a deadline for applications update or negotiate otherwise the point in time when he/she activates the changes on the system level. In a typical implementation of the Meta-Market, there may be a grace period allowing the vendors to adopt their applications to the new system requirements, so that the system won't be broken. After the applications are updated (if needed) or upon another event decided by the system manager (depends on the Meta-Market implementation), the system manager may activate the system changes in the Meta-Market, so that they are reflected in the production version of the system (visible to users). Users (1423.4) may be either all or a group of users of a production system or a separate tester group of users, depending on the meta-market (146) implementation. Activation request—a system manager (142.14) may request the market (146) to activate the system changes of this update (system level and application level) (1423.1) or adjust the system (142.2). 1423.9—A system manager in charge (142.14) decision, in most implementations it is a human interaction and human decisions, although in some implementations, there may be AI (artificial intelligence) systems and AI decisions on this or other steps of the meta-market (146) flows that typically assume a human interaction. (1423.8)—update both on the system level (1423.2) (including applications types data updates, if needed) and an application level (1424). 1425, as used in the Figure, represents "retry a part of the process or drop" (1425).

Figure 26:
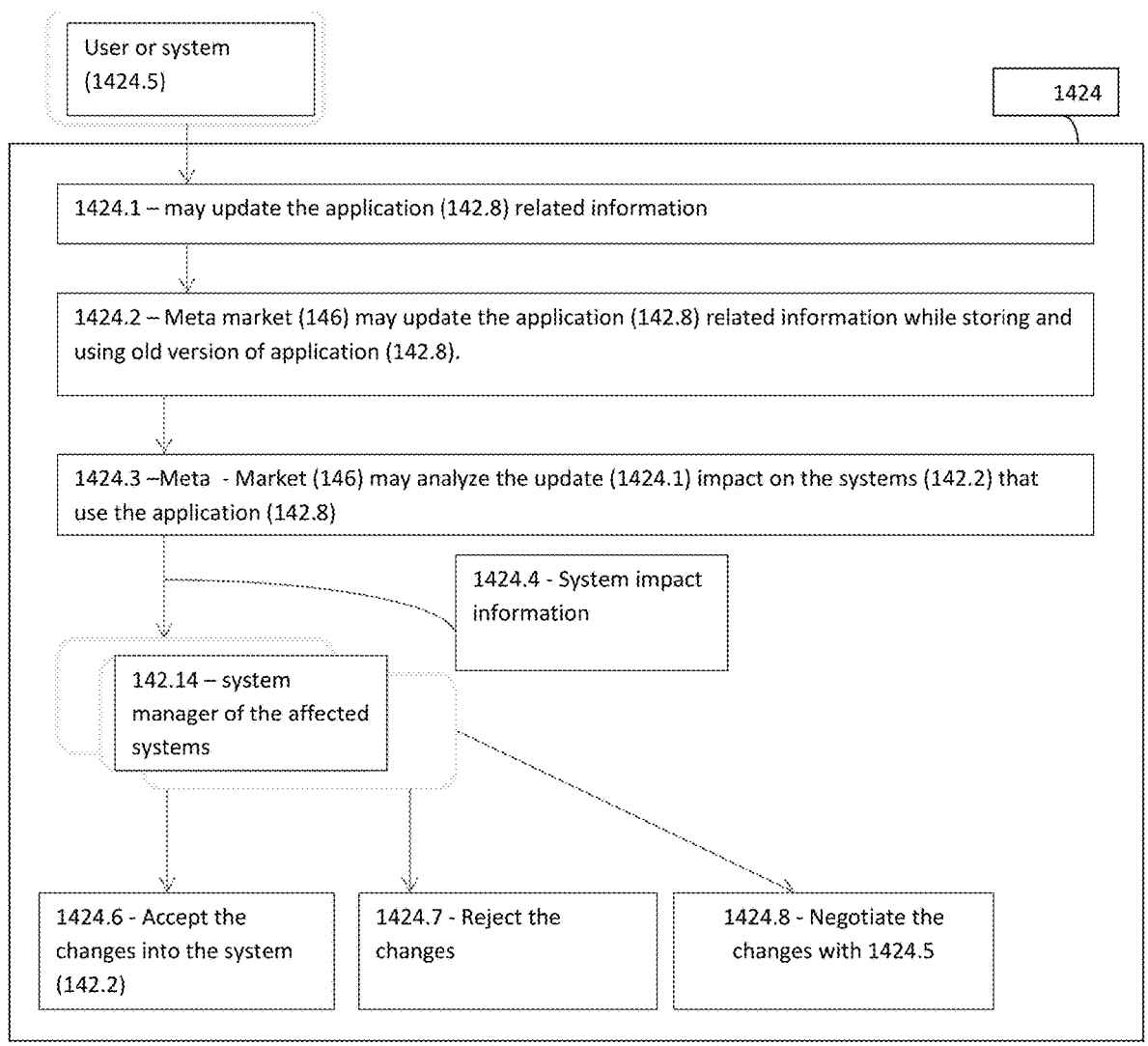
FIG. 26 illustrates a method of updating an application (142.8) within a system (142.2) as well as an update on an application level (1424) from FIG. 25.

FIG. 26 illustrates a method for updating an application (142.8) within a system (142.2) as well as an update on an application level (1424) from FIG. 25. An application level update (1424) may be performed upon an update request (1424.0), upon a decision of a developer/vendor/system administrator (manager) in charge (142.14), or upon other triggers. 1424.1—may update the application (142.8) related information optionally including, code, binaries, resource, DB, system requirements and software versions, exported functionality, among others. 1424.1—may update the application (142.8) related information via one of the Meta-Market clients or via an API to the meta-market server, or via another interface. 1424.2—Meta market (146) (in a typical implementation of the invention, the meta-market server, but there may also be distributed client-based implementations (e.g., Skype VOIP service or GIT version control) may update the application (142.8) related information, while storing and using old version of an application (142.8). At this point, in a typical implementation of a metamarket, if a user downloads a system with this application, the user still receives an old version of the application (142.8). The application changes may be activated (included in a main version which the user downloads and/or offered to users in system updates) by some systems (142.2) and not accepted by others. This means that there may be several active and maintained versions of an application (142.8) on a market.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A method for use with a first device operative to be in first and second operating states, and a second device housed in a mobile or wearable enclosure, the first and second devices
    communicate with each other over a wireless network, and the second device comprises a sensor that outputs a sensor data in response to a physical phenomenon,
    the method comprising, by the first device:
    receiving an activation input in the first operating state;
    responsive to receiving the activation input broadcasting an advertisement message;
    receiving a connection request message that comprises at least a connection request from the second device in response to the advertisement message;
    determining that the second device is an authorized device; and
    transitioning the first device to the second operating state, based at least in part on the determination that the second device is an authorized device,
    the method further comprising, by the second device:
    in response to receiving of the advertisement message determining whether the second device is allowed to send the connection request message to the first device; and
    in response to the determination that the second device is allowed to send the connection request message to the first device, sending the connection request message comprising at least a second data to the first device,
    wherein the determination by the first device that the second device is an authorized device is based on the second data,
    wherein in the second operating state of the first device allows a performing of a first task by the first device, and
    wherein in the first operating state of the first device prevents from the performing of the first task by the first device,
    the method is preceded by the first device adding the second device to a whitelist of devices in response to communicating between the first and the second devices; and the determination by the first device that the second device is an authorized device is responsive to the second device being included in the whitelist of devices.

2. The method according to claim 1, wherein the determining by the second device whether the second device is allowed to send the connection request message to the first device is based at least on the sensor data, and
    wherein the second data is calculated as a function of the sensor data.

3. The method according to claim 1, wherein the wireless network is Wireless Personal Area Network (WPAN).

4. The method according to claim 3, wherein the wireless network is a Bluetooth Low Energy (BLE) network.

5. The method according to claim 4, wherein the communicating includes at least a preliminary Bluetooth pairing.

6. The method according to claim 1, wherein the first operating state is a locked state and the second operating state is an unlocked state.

7. The method according to claim 1, wherein the first operating state is a logged out state and the second operating state is a logged in into an account state.

8. The method according to claim 1, wherein the second device is housed in a wearable enclosure.

9. The method according to claim 8, wherein the wearable enclosure is a smart watch.

10. The method according to claim 1, wherein the wireless network is a Bluetooth Low Energy (BLE) network and the first device is a smartphone and the second device is housed in a wearable enclosure.

11. The method according to claim 10, wherein the wearable enclosure is smartwatch.

12. The method according to claim 1, wherein the first device is housed in a door lock and second device is housed in a wearable enclosure.

13. The method according to claim 12, wherein the wearable enclosure is a smart ring.

14. The method according to claim 12, wherein the wearable enclosure is a smart watch.

15. The method according to claim 12, wherein the first device allows for the door lock to open in response to the operating state.

16. The method according to claim 1, wherein the first device is housed in a wearable watch and the second device is housed in a smartphone.

17. The method according to claim 1, wherein each of the first and second devices further comprises a memory or a non-transitory tangible computer readable storage media for storing computer executable instructions that comprises at least part of the steps of claim 1, and a processor for executing the instructions, and wherein each of the first and second devices further comprises a network interface.

18. The method according to claim 1, wherein the transitioning is based on an information received from the second device.

19. The method according to claim 18, wherein the information received from the second device proves that the second device is associated with the same account as the first device.

20. The method according to claim 1, wherein the first device stays in the second operating state in response to continuously receiving messages from the second device.

* * * * *

UNITED STATES PATENT AND TRADEMARK OFFICE
CERTIFICATE OF CORRECTION

| | | |
|---|---|---|
| PATENT NO. | : 10,959,099 B2 | Page 1 of 1 |
| APPLICATION NO. | : 16/256382 | |
| DATED | : March 23, 2021 | |
| INVENTOR(S) | : Natalya Segal | |

It is certified that error appears in the above-identified patent and that said Letters Patent is hereby corrected as shown below:

In the Specification

Column 1 Line 12, after "to," insert:
--Application No. 16/256,382 is a continuation of application No. 15/921,725 which is a continuation of Application No. 14/273,342 which claims priority to provisional application 61/820,788, filed May 8, 2013.--

Signed and Sealed this
Fourth Day of April, 2023

Katherine Kelly Vidal
*Director of the United States Patent and Trademark Office*